US009310545B2

(12) United States Patent
Parker et al.

(10) Patent No.: US 9,310,545 B2
(45) Date of Patent: Apr. 12, 2016

(54) LIGHTING ASSEMBLY WITH ADJUSTABLE LIGHT OUTPUT

(75) Inventors: Jeffery R. Parker, Richfield, OH (US); Timothy A. McCollum, Avon Lake, OH (US); Fumitomo Hide, San Jose, CA (US); Alexey Titov, Sagamore Hills, OH (US); Ian Hardcastle, Sunnyvale, CA (US)

(73) Assignee: Rambus Delaware LLC, Brecksville, OH (US)

( * ) Notice: Subject to any disclaimer, the term of this patent is extended or adjusted under 35 U.S.C. 154(b) by 1064 days.

(21) Appl. No.: 13/421,145

(22) Filed: Mar. 15, 2012

(65) Prior Publication Data

US 2012/0236591 A1 Sep. 20, 2012

Related U.S. Application Data

(60) Provisional application No. 61/453,763, filed on Mar. 17, 2011, provisional application No. 61/454,218, filed on Mar. 18, 2011.

(51) Int. Cl.
| | |
|---|---|
| *F21V 7/04* | (2006.01) |
| *F21V 8/00* | (2006.01) |
| *F21K 99/00* | (2010.01) |
| *F21Y 101/02* | (2006.01) |

(52) U.S. Cl.
CPC ............... *G02B 6/0016* (2013.01); *F21K 9/58* (2013.01); *G02B 6/0021* (2013.01); *F21K 9/13* (2013.01); *F21K 9/52* (2013.01); *F21Y 2101/02* (2013.01)

(58) Field of Classification Search
CPC .. G02B 6/0013; G02B 6/0016; G02B 6/0021; G02B 6/0026
See application file for complete search history.

(56) References Cited

U.S. PATENT DOCUMENTS

| 5,136,480 A | 8/1992 | Pristash .......................... 362/31 |
| 5,506,929 A * | 4/1996 | Tai et al. ....................... 385/146 |
| 6,528,937 B1 | 3/2003 | Van Gorkom ................ 313/485 |

(Continued)

FOREIGN PATENT DOCUMENTS

| FR | 2759764 | 8/1998 | |
| JP | 2005-222750 | 8/2005 | ............. F21V 23/00 |
| WO | 2008/080141 | 7/2008 | |

OTHER PUBLICATIONS

Extended European Search Report for corresponding Application No. 12757524.9 dated Aug. 14, 2014.

(Continued)

*Primary Examiner* — Evan Dzierzynski
(74) *Attorney, Agent, or Firm* — Renner, Otto, Boisselle & Sklar, LLP

(57) ABSTRACT

A lighting assembly includes a light guide and light source. The light guide includes light input regions, at least one of the light input regions associated with an optical modifying characteristic, and the light guide is configured to propagate light by total internal reflection. The light source is located adjacent the light input regions. The light source and light input regions are variably positionable relative to one another to vary a location at which light is incident on the light input regions such that light emitted from the light source is selectively apportioned between the light input regions. A characteristic of the light output from the lighting assembly is modified based on the optical modifying characteristic of the at least one of the light input regions and the relative positioning of the light source and the light input regions.

32 Claims, 17 Drawing Sheets

(56) References Cited

U.S. PATENT DOCUMENTS

| | | | |
|---|---|---|---|
| 6,601,962 B1 * | 8/2003 | Ehara et al. | 362/612 |
| 6,976,779 B2 * | 12/2005 | Ohtsuki et al. | 362/608 |
| 7,161,313 B2 | 1/2007 | Piepgras et al. | 315/318 |
| 7,223,007 B1 | 5/2007 | Fredley et al. | 362/616 |
| 7,331,681 B2 | 2/2008 | Pohlert et al. | 362/18 |
| 7,651,243 B2 | 1/2010 | McGuire, Jr. et al. | 362/293 |
| 7,663,733 B2 | 2/2010 | Glent-Madsen et al. | 355/53 |
| 7,665,865 B1 | 2/2010 | Hulse et al. | 362/277 |
| 7,806,538 B2 | 10/2010 | Ajiki et al. | 362/19 |
| 8,184,236 B2 * | 5/2012 | Aritake et al. | 349/65 |
| 2003/0043567 A1 * | 3/2003 | Hoelen et al. | 362/31 |
| 2003/0223218 A1 * | 12/2003 | Kawakami | 362/31 |
| 2004/0071437 A1 * | 4/2004 | Tamura et al. | 385/146 |
| 2006/0268537 A1 * | 11/2006 | Kurihara et al. | 362/34 |
| 2007/0263388 A1 | 11/2007 | Lai et al. | 362/287 |
| 2007/0263409 A1 * | 11/2007 | Mok | 362/612 |
| 2009/0001397 A1 * | 1/2009 | Fine et al. | 257/98 |
| 2009/0086475 A1 | 4/2009 | Caruso et al. | |
| 2009/0091915 A1 | 4/2009 | Eriksson | 362/84 |
| 2009/0103293 A1 | 4/2009 | Harbers et al. | 362/231 |
| 2009/0129115 A1 * | 5/2009 | Fine et al. | 362/606 |
| 2009/0141476 A1 * | 6/2009 | Meir et al. | 362/84 |
| 2009/0180282 A1 * | 7/2009 | Aylward et al. | 362/245 |
| 2009/0231847 A1 * | 9/2009 | Pan et al. | 362/240 |
| 2009/0316077 A1 * | 12/2009 | Li et al. | 349/65 |
| 2010/0033948 A1 | 2/2010 | Harbers et al. | 362/84 |
| 2010/0246158 A1 | 9/2010 | Van Gorkom et al. | 362/19 |
| 2010/0315810 A1 | 12/2010 | Tseng | 362/234 |
| 2010/0321931 A1 | 12/2010 | McDermott | 362/190 |
| 2011/0013389 A1 | 1/2011 | Willemsen et al. | 362/231 |
| 2011/0205727 A1 * | 8/2011 | Kim et al. | 362/84 |
| 2011/0273906 A1 * | 11/2011 | Nichol | G02B 6/0076 362/607 |
| 2012/0230039 A1 * | 9/2012 | Hansen Ellevang et al. | 362/351 |

OTHER PUBLICATIONS

International Search Report and Written Opinion of the International Searching Authority re PCT/US2012/029216 issued Mar. 15, 2012 mailed Sep. 28, 2012. 8 pages.

* cited by examiner

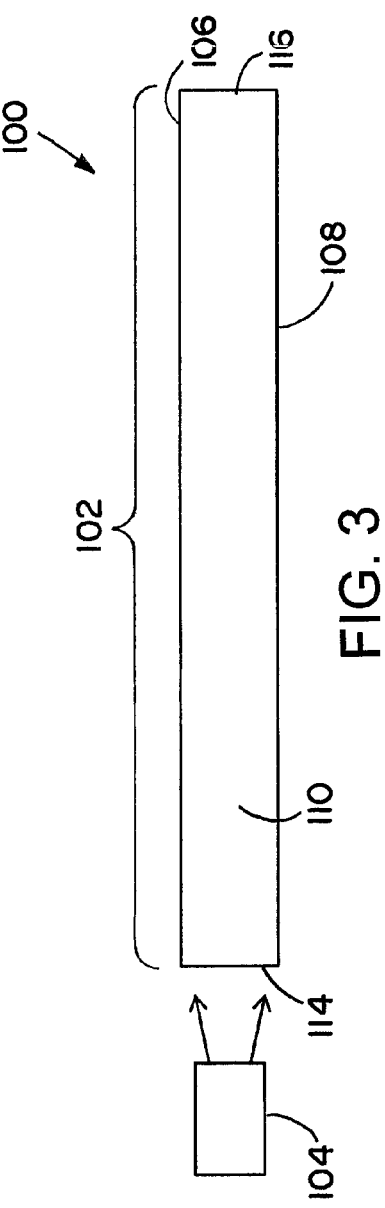
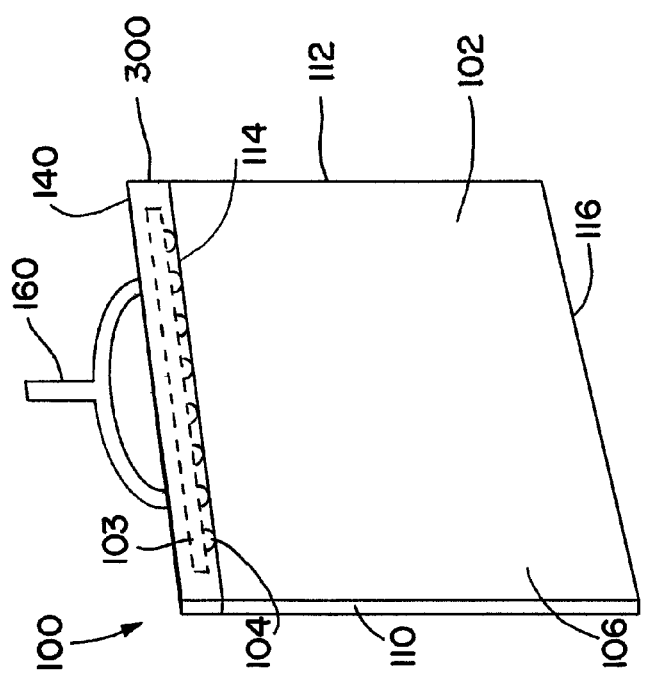
FIG. 3
FIG. 2

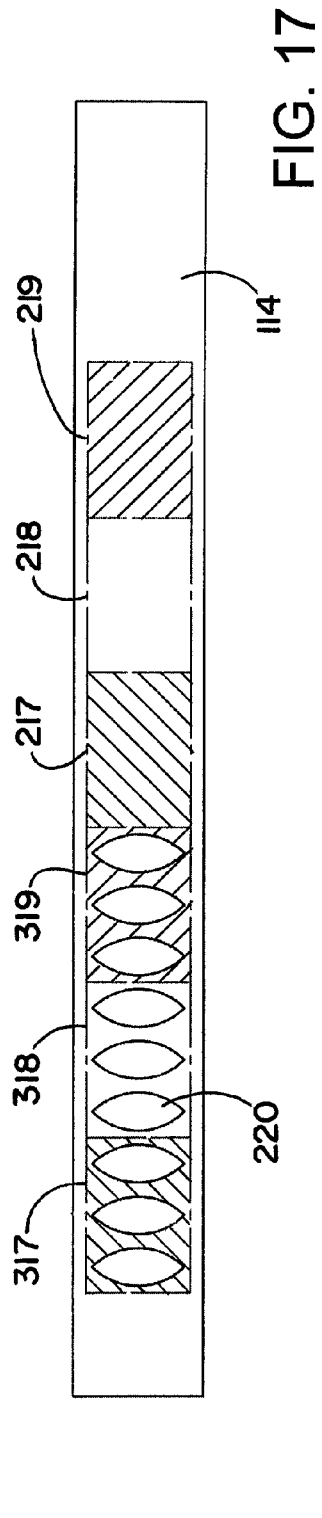
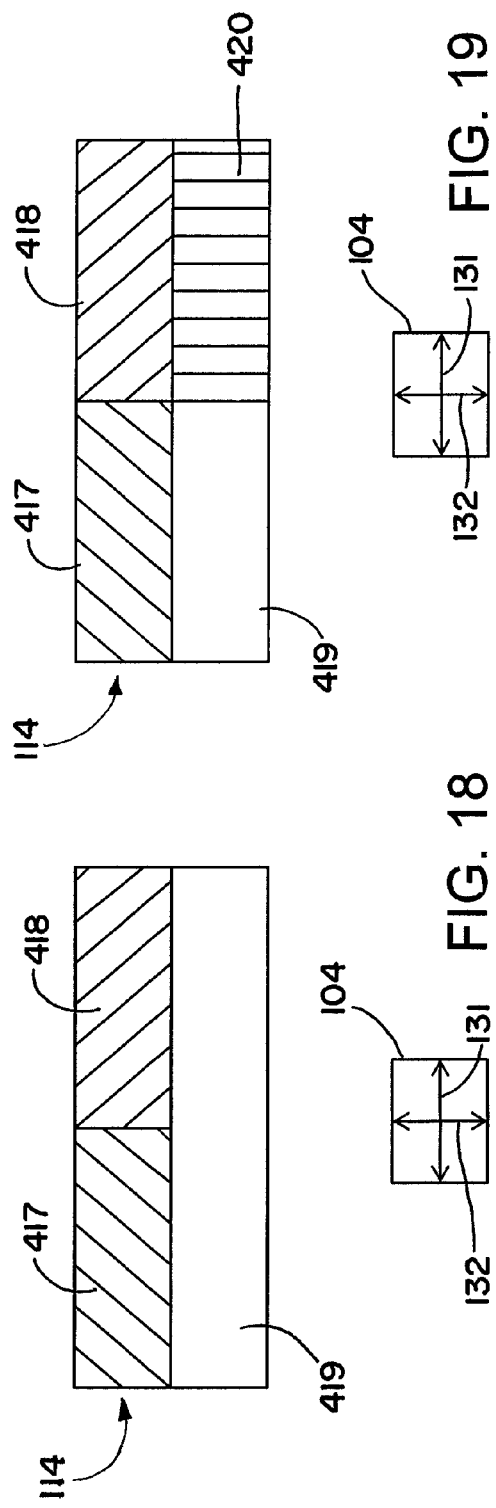
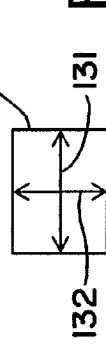
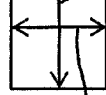
FIG. 17
FIG. 18
FIG. 19

LIGHTING ASSEMBLY WITH ADJUSTABLE LIGHT OUTPUT

RELATED APPLICATION DATA

This application claims the benefit of U.S. Provisional Patent Application No. 61/453,763, filed Mar. 17, 2011, and claims the benefit of U.S. Provisional Patent Application No. 61/454,218, filed Mar. 18, 2011, the disclosures of which are incorporated herein by reference in their entireties.

BACKGROUND

Energy efficiency has become an area of interest for energy consuming devices. One class of energy consuming devices is lighting devices. Light emitting diodes (LEDs) show promise as energy efficient light sources for lighting devices. But control over color and light output distribution is an issue for lighting devices that use LEDs or similar light sources.

BRIEF DESCRIPTION OF THE DRAWINGS

FIG. 2 is a schematic view of a lighting fixture representing another exemplary lighting assembly with adjustable light output;

FIGS. 3-6 are schematic views showing part of an embodiment of a lighting assembly having adjustable light output;

FIG. 17 is a schematic view showing another arrangement of light input regions of a lighting assembly having adjustable light output;

FIGS. 18 and 19 are schematic views showing another arrangement of light input regions of a lighting assembly having adjustable light output.

DESCRIPTION

Figure 1:
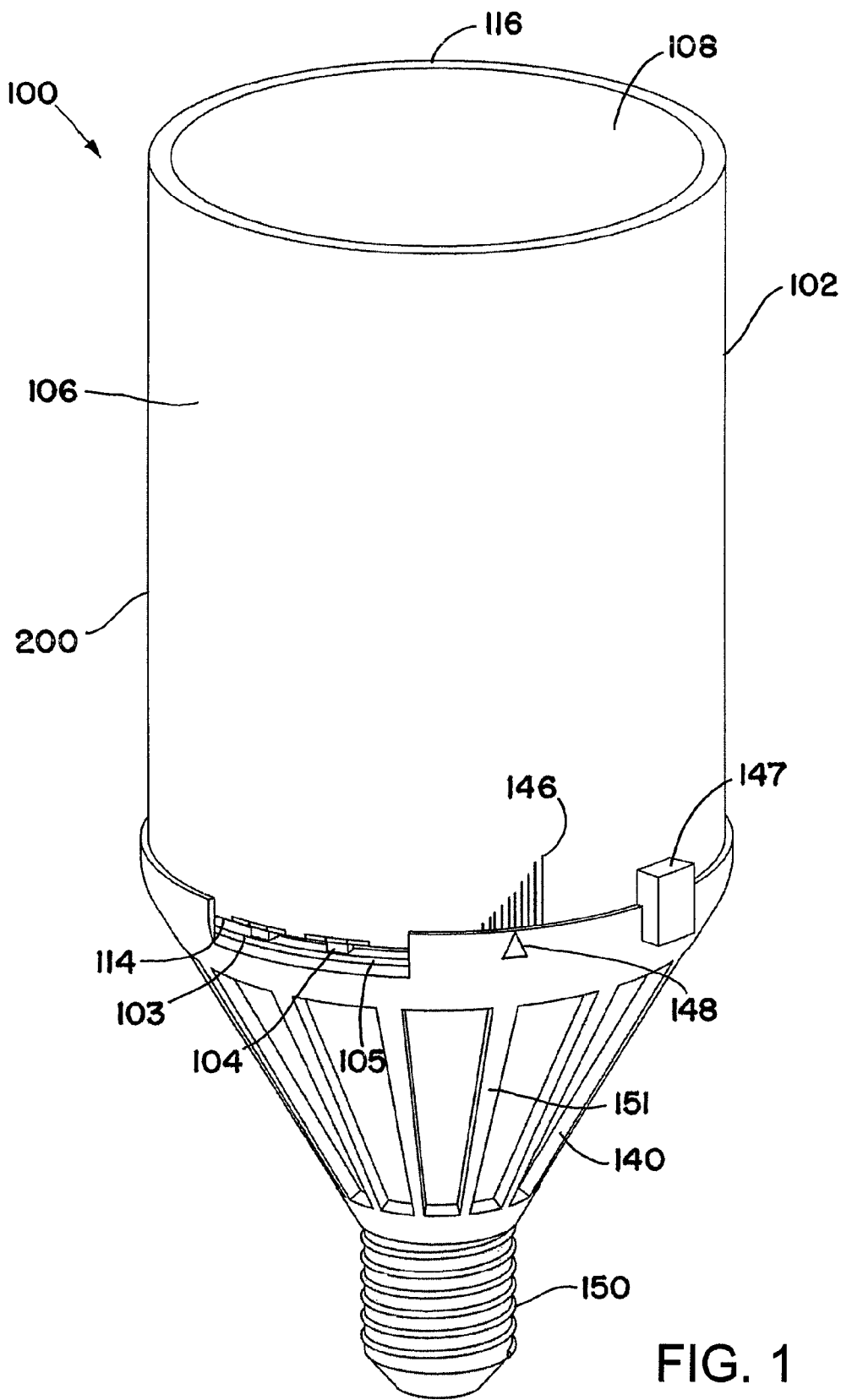
FIG. 1 is a schematic view of a light bulb representing an exemplary lighting assembly with adjustable light output, where a portion of a housing of the light bulb is cut away to show a light source assembly.

Embodiments will now be described with reference to the drawings, wherein like reference numerals are used to refer to like elements throughout. The figures are not necessarily to scale. Features that are described and/or illustrated with respect to one embodiment may be used in the same way or in a similar way in one or more other embodiments and/or in combination with or instead of the features of the other embodiments.

Aspects of this disclosure relate to a lighting assembly. As illustrated in FIG. 1, one type of lighting assembly 100 is a light bulb 200. As illustrated in FIG. 2, another type of lighting assembly 100 is a lighting fixture 300. The lighting assembly 100, whether a light bulb 200 (e.g., as shown in FIG. 1), a lighting fixture 300 (e.g., as shown in FIG. 2), or another type of lighting device, is described in greater detail herein with reference to the various embodiments illustrated in the figures.

The lighting assembly includes a light guide and a light source. The light guide includes light input regions, at least one of the light input regions associated with an optical modifying characteristic, and the light guide is configured to propagate light by total internal reflection. The light source is located adjacent the light input regions and the light source and light input regions are variably positionable relative to one another to vary the location at which light is incident on the light input regions. Light emitted from the light source is selectively apportioned between the light input regions so that a characteristic of the light output from the lighting assembly is modified based on the optical modifying characteristic of the at least one of the light input regions and the relative positioning of the light source and the light input regions.

In the case of the light bulb, the light bulb additionally includes a base configured to mechanically mount the light bulb and receive electrical power.

With additional reference to FIGS. 3-6, the lighting assembly 100 includes a light guide 102, which is a solid article made from, for example, acrylic, polycarbonate, glass, or other appropriate material. The light guide 102 may be rigid or flexible. The light guide 102 may also be a multi-layer light guide having two or more layers. The light guide 102 includes a first major surface 106 and a second major surface 108 opposite the first major surface 106. The light guide 102 is configured to propagate light by total internal reflection (TIR) between the first major surface 106 and the second major surface 108.

The light guide 102 includes light extracting elements (not shown) in or on at least one of the major surfaces 106, 108. Light extracting elements that are in or on a major surface 106, 108 will be referred to as being "at" the major surface. Each light extracting element functions to disrupt the total internal reflection of the propagating light that is incident on the light extracting element. In one embodiment, the light extracting elements reflect light toward the opposing major surface so that the light exits the light guide 102 through the opposing major surface. Alternatively, the light extracting elements transmit light through the light extracting elements and out of the major surface of the light guide 102 having the light extracting elements. In another embodiment, both of these types of light extracting elements are present. In yet another embodiment, the light extracting elements reflect some of the light and refract the remainder of the light incident thereon. Therefore, the light extracting elements are configured to extract light from one or both of the major surfaces 106, 108.

Light guides having such light extracting elements are typically formed by a process such as stamping, molding, embossing, extruding, laser etching, chemical etching, or another suitable process. Light extracting elements may also be produced by depositing elements of curable material on the light guide 102 and curing the deposited material using heat, UV-light or other radiation. The curable material can be deposited by a process such as printing, ink jet printing, screen printing, or another suitable process.

Exemplary light extracting elements include light-scattering elements, which are typically features of indistinct shape or surface texture, such as printed features, ink-jet printed features, selectively-deposited features, chemically etched features, laser etched features, and so forth. Other exemplary light extracting elements include features of well-defined shape, such as V-grooves, lenticular grooves, and features of well-defined shape that are small relative to the linear dimensions of the major surfaces 106, 108, which are sometimes referred to as micro-optical elements. The smaller of the length and width of a micro-optical element is less than one-tenth of the longer of the length and width of the light guide 102 and the larger of the length and width of the micro-optical element is less than one-half of the smaller of the length and width of the light guide. The length and width of the micro-optical element is measured in a plane parallel to the major surface 106, 108 of the light guide 102 for flat light guides or along a surface contour for non-flat light guides 102.

Micro-optical elements are shaped to predictably reflect or refract light. However, one or more of the surfaces of the micro-optical elements may be modified, such as roughened, to produce a secondary effect on light output. Exemplary micro-optical elements are described in U.S. Pat. No. 6,752, 505 and, for the sake of brevity, are not described in detail in this disclosure. The micro-optical elements may vary in one or more of size, shape, depth or height, density, orientation, slope angle or index of refraction such that a desired light output from the light guide is achieved.

Figure 4:
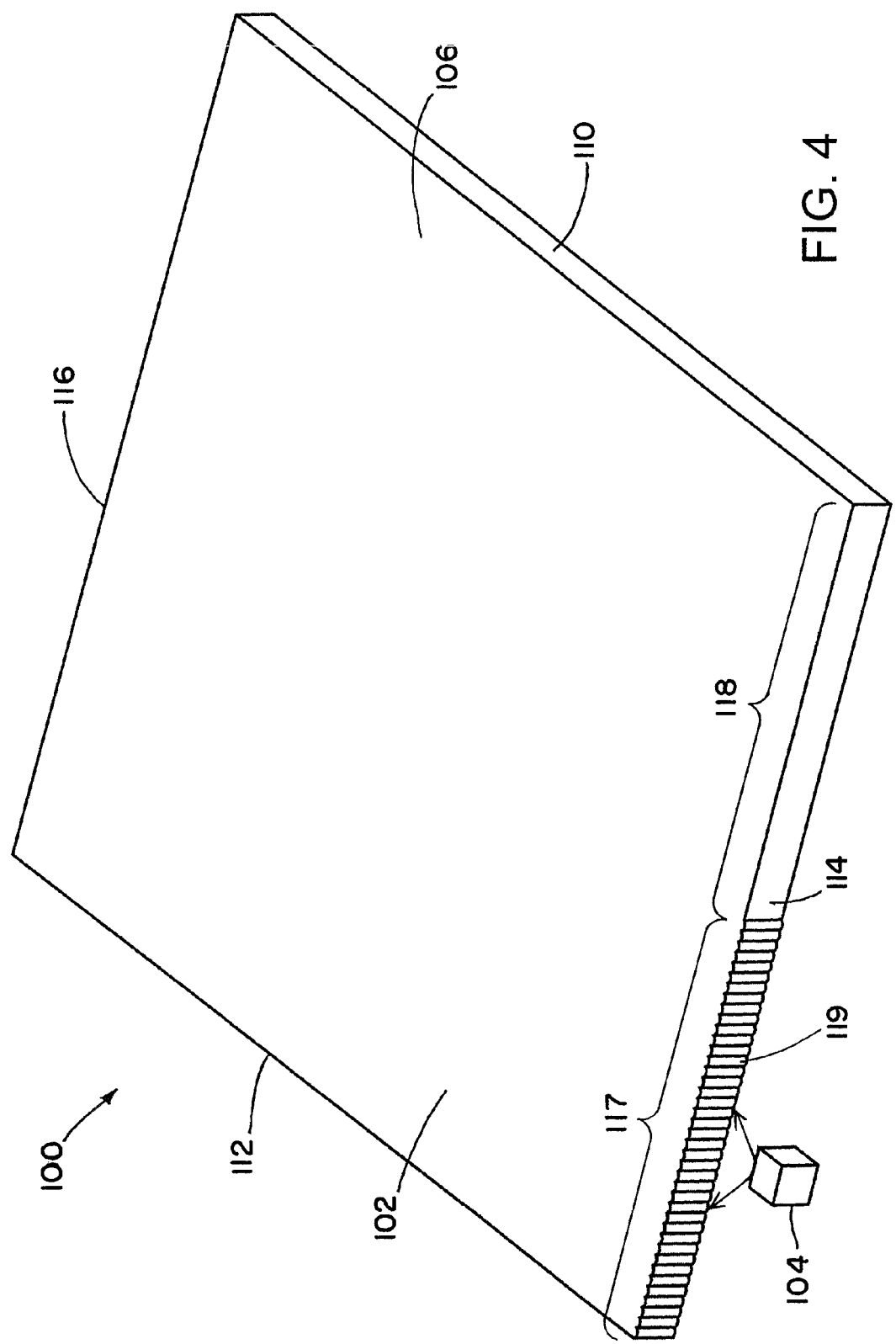
Figure 5:
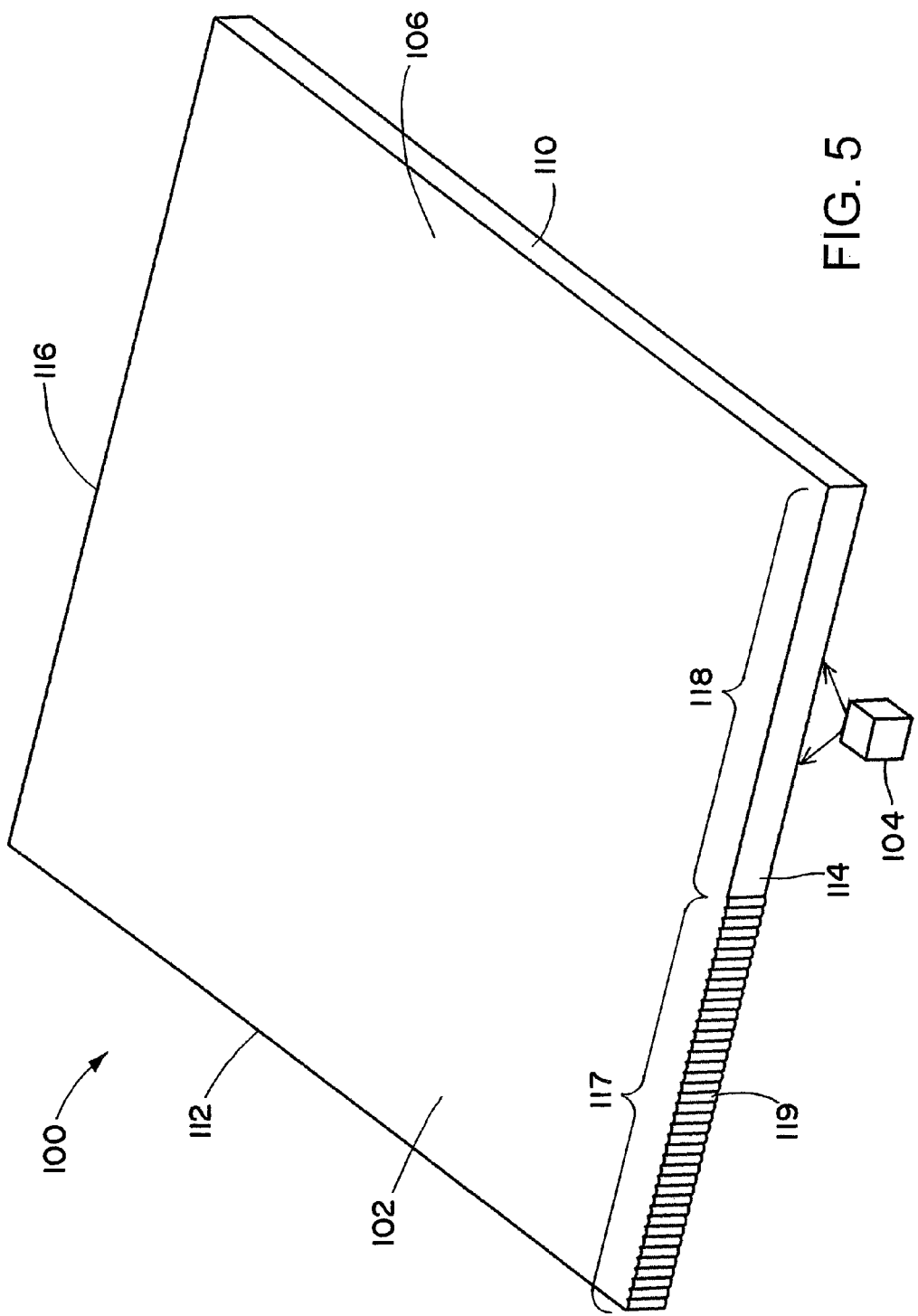

The light guide 102 has at least one external edge, the total number of external edges depending on the configuration of the light guide 102. An external edge is an edge that is not completely surrounded by the light guide 102. In the case where the light guide 102 is rectangular (e.g., as shown in FIG. 4), the light guide 102 has four external edges 110, 112, 114, 116 (e.g., side edges 110, 112, end edge 116, and light input edge 114). In other embodiments, the light guide has a different shape, and the total number of external edges is different. For example, where the light guide 102 is a hollow cylinder (e.g., as shown in FIG. 1), is frustroconical, is a frustrated pyramid, is a dome with a hole cut at the dome's apex, or another similar shape, the light guide has two opposing external edges 114, 116. In an embodiment where the light guide 102 is shaped like a dome or has a shape approximating the bulbous shape of a conventional incandescent bulb, the light guide 102 has a single external edge. Other geometries for the light guide 102 result in a corresponding number of external edges. Depending on the geometry of the light guide 102, each external edge may follow a straight path or a curved path, and adjacent edges may meet at a vertex or join in a curve.

In some embodiments, the light guide 102 includes an internal edge (not shown), which is an edge completely surrounded by the light guide 102. The internal edge is usually the edge of a hole that extends between the major surfaces of the light guide 102.

The length and width dimensions of each of the major surfaces 106, 108 are much greater, typically ten or more times greater, than the thickness of the light guide 102. The thickness is the dimension of the light guide 102 in a direction orthogonal to the major surfaces 106, 108. In the rectangular embodiment, the length (measured from external edge 114 to external edge 116) and the width (measured from external edge 110 to external edge 112) of each of the major surfaces are both much greater than the thickness of the light guide 102. The thickness of the light guide 102 may be, for example, about 0.1 millimeters (mm) to about 10 mm.

At least one of the edges, whether an external edge or internal edge, serves as a light input edge. Light emitted from one or more light sources 104 is directed toward the light input edge. In the embodiment shown in FIGS. 3-6, external edge 114 serves as the light input edge.

The light input edge 114 includes light input regions. The light input regions are associated with different optical modifying characteristics. An optical modifying characteristic is indicated by an effect that the light input region has on light that is incident thereon. For purposes of this description, a light input region that lacks an optical modifying characteristic will be considered specularly transmissive, even though specularly transmissive material refracts light that passes through the material at a non-zero angle of incidence. Exemplary optical modifying characteristics and the effect that the light input regions have on light incident thereon are discussed in more detail below with reference to the illustrated embodiments.

The light input edge includes any appropriate number of light input regions. Furthermore, any appropriate number of light input regions may be associated with a given light source. In the illustrated embodiments, the change in optical modifying characteristic from one light input region to another light input region is abrupt. In other embodiments, the transition between the light input regions may be gradual.

FIGS. 3-6 illustrate an embodiment where light source 104 is associated with input regions 117, 118. In the illustrated embodiment, the optical modifying characteristic of one of the light input regions modifies the light ray angle distribution of the light incident thereon. In an example, light input region 117 includes optical elements, an exemplary one of which is shown at 119. The reference numeral 119 will additionally be used to refer to the optical elements collectively. The optical elements 119 modify the light ray angle distribution of the light incident thereon. In this disclosure, the term light ray angle distribution is used to describe the variation of the intensity of light with ray angle (typically a solid angle) over a defined range of ray angles. In an example in which the light is input to an edge-lit light guide, the defined range of ray angles is from −90° to +90° relative to the normal to the light input region 117 in a direction away from the light source 104.

The optical elements 119 of the light input region 117 are illustrated as lenticular grooves oriented orthogonally to major surfaces 106, 108. In other embodiments, the optical elements 119 have other suitable orientations and shapes, for example, lenticular grooves oriented parallel to major surfaces 106, 108, V-grooves oriented orthogonally to major surfaces 106, 108, V-grooves oriented parallel to major surfaces 106, 108, lenses, or combinations thereof. Other exemplary optical elements include light-scattering elements, which are typically features of indistinct shape or surface texture, such as printed features, ink jet printed features, selectively-deposited features, chemically etched features, laser etched features, and so forth. Other exemplary optical elements include features of well-defined shape, such as V-grooves, lenticular grooves, and features of well-defined shape that are small relative to the linear dimensions of the light input edge 114, which are sometimes referred to as micro-optical elements for the light input region. The smaller of the length and width of a micro-optical element is less than one-half of the longer of the length and width of the light input edge 114, and the larger of the length and width of the micro-optical element is less than the smaller of the length and width of the light input edge 114. The length and width of the micro-optical element for the light input region is measured in the plane that is parallel to and includes the light input edge 114 of the light guide 102 for flat light guides or along a surface contour for non-flat light guides.

Micro-optical elements at the light input region are shaped to predictably refract light incident thereon. However, one or more of the surfaces of the micro-optical elements may be modified, such as roughened, to produce a secondary effect on light incident thereon. Exemplary micro-optical elements are described in U.S. Pat. No. 6,752,505 and, for the sake of brevity, will not be described in detail in this disclosure. The micro-optical elements for the light input region may vary in one or more of size, shape, depth or height, density, orientation, slope angle, or index of refraction such that a desired optical modifying characteristic is achieved over the corresponding light input region.

In the illustrated embodiment, light input region 118 includes a planar surface. As such, the light input region 118 provides little or no modification of the light ray angle distribution of the light incident thereon beyond that resulting from refraction at a plane surface. The light input region 118 is therefore considered specularly transmissive. In other embodiments, light input region 118 includes optical elements that are different than the optical elements 119 in light input region 117 to provide a light ray angle distribution modification different than that provided by the light input region 117.

The lighting assembly 100 further includes a light source assembly 103 (e.g., as shown in FIGS. 1 and 2). The light source assembly 103 includes one or more light sources 104 positioned adjacent the light input edge 114. Each light source 104 is typically embodied as one or more solid-state devices. In one embodiment, the light sources 104 are mounted to a printed circuit board (PCB) 105 (e.g., as shown in FIG. 1). Accordingly, the light sources 104 are fixed in position relative to one another. As described in greater detail below, the light sources 104 and the light input edge 114 of the light guide 102 are variably positionable relative to one another.

In some embodiments, the light sources 104 are positioned relative to the light input regions 117, 118 such that the apportionment of the light from each light source 104 between the light input regions 117, 118 associated with the light source is the same for all the light sources. Consequently, the light entering the light guide 102 has the same characteristic (e.g., spectrum and/or light ray angle distribution) regardless of the light source from which it originated.

Exemplary light sources include such solid state devices as LEDs, laser diodes, and organic LEDs (OLEDs). In an embodiment where the light source 104 includes one or more LEDs, the LEDs may be top-fire LEDs or side-fire LEDs, and may be broad spectrum LEDs (e.g., emits white light) or LEDs that emit light of a desired color or spectrum (e.g., red light, green light, blue light, or ultraviolet light). In one embodiment, the light source 104 emits light with no operably-effective intensity at wavelengths greater than 500 nanometers (nm) (i.e., the light source 104 emits light at wavelengths that are predominantly less than 500 nm). In some embodiments, each light source 104 included in the lighting assembly 100 has the same nominal spectrum. In other embodiments, the light sources are different from each other (e.g., two different types of light sources alternatively located along the light source assembly as will be described below with reference to FIGS. 20 and 21).

Although not specifically illustrated in detail, the light source assembly 103 also includes structural components (e.g., PCB 105 as shown in FIG. 1) to retain the light source 104. The light source assembly 103 may additionally include: circuitry, power supply and/or electronics for controlling and driving the light source 104, and any other appropriate components.

Each light source is associated with two or more light input regions of the light guide 102. In the example shown, two light input regions 117, 118 are associated with the light source 104. Other examples have more than two light input regions associated with each light source. The light source 104 and the associated light input regions are variably positionable relative to one another such that light emitted by the light source 104 is incident on the light input regions 117, 118 and is variably apportioned between the light input regions depending on the relative positioning of the light input regions 117, 118 and the light source 104. In an example, the relative positioning of the light source and the light input region is varied by moving the light source along a direction parallel to the major surfaces 106, 108 and parallel to the light input edge 114 of the light guide 102 (in a forward direction and a reverse direction) to selectively apportion light emitted from the light source among the light input regions. In one embodiment, moving the light source in the forward direction provides output light with a first characteristic and moving the light source in the reverse direction provides output light with a second characteristic different from the first characteristic.

Figure 6:
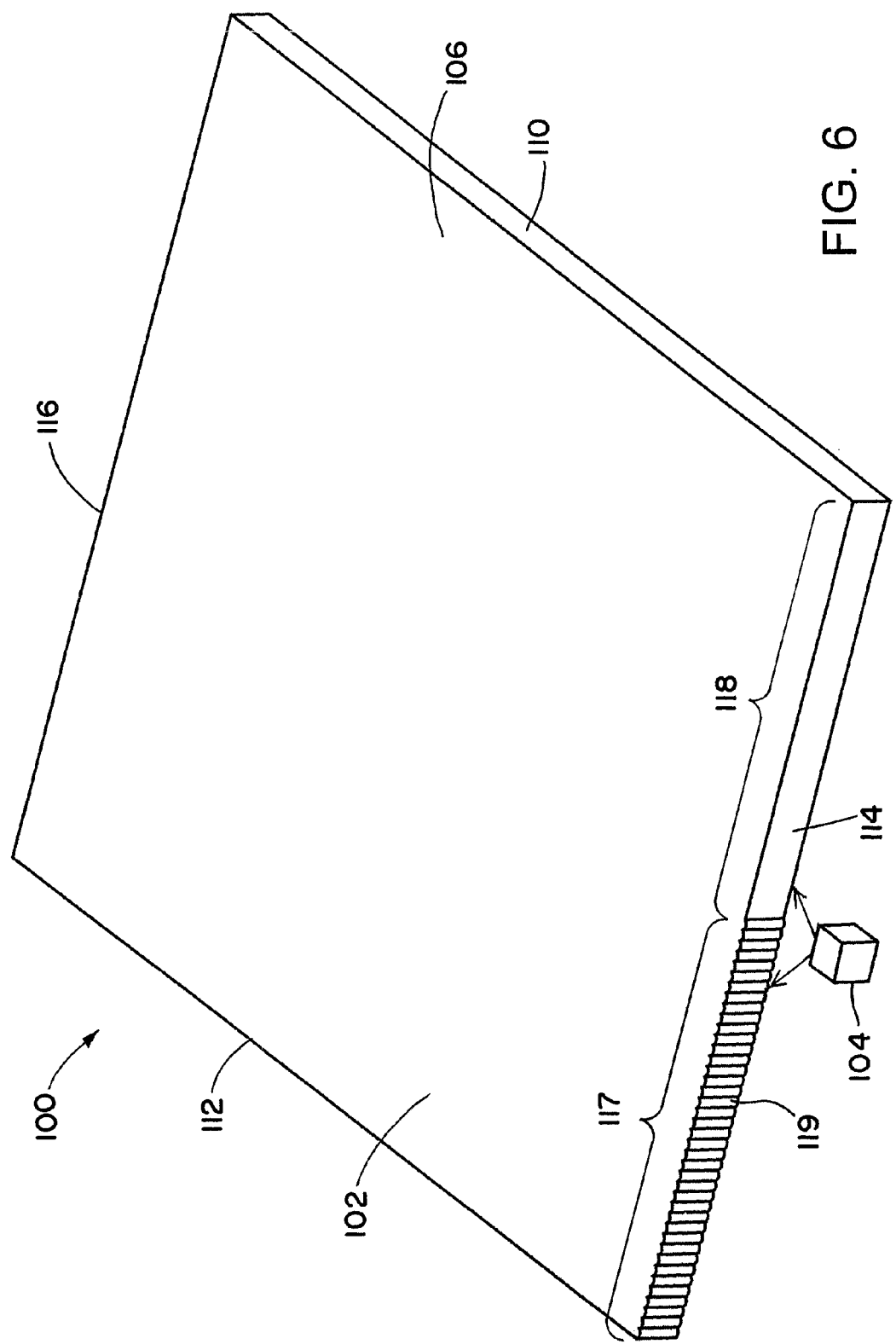

For example, in FIG. 4, the light source 104 is located adjacent the light input region 117 of the light input edge 114. Therefore, more of the light emitted from the light source 104 is incident on the light input region 117 than is incident on the light input region 118. As further shown in FIGS. 5 and 6, the light source 104 has been moved laterally by respective distances relative to the position shown in FIG. 4 to vary the position of the light source 104 relative to the light guide 102 and produce a corresponding change in the apportionment of the light incident on the light input regions. For example, in FIG. 5 the light source 104 is located adjacent the light input region 118 of the light input edge 114. Therefore, more of the light emitted from the light source 104 is incident on the light input region 118 than is incident on the light input region 117. In FIG. 6, the light source 104 is located in an intermediate position adjacent both the light input region 117 and the light input region 118 of the light input edge 114. Therefore, similar amounts of the light emitted from the light source 104 are incident on the light input region 117 and the light input region 118. By moving the light source 104 and the associated light input regions 117, 118 relative to one another, light emitted from the light source is selectively apportioned between the light input regions so that a characteristic of the light output from the lighting assembly is modified based on the optical modifying characteristics of the light input regions 117, 118 and the relative positioning of the light source 104 and the light input regions 117, 118.

In one embodiment, the relative positioning is varied manually by a user. In the example shown in FIG. 1, the lighting assembly 100 includes a user-manipulable mechanism 147 that moves one or both of the light guide 102 and the light source 104 relative to the other to vary the relative positioning of the light input regions and the light source 104. As shown in FIG. 1, the light source 104 is fixed relative to a housing 140 and the light guide 102 is rotatably moveable relative thereto by the manual application of force to the mechanism 147. In the embodiment of FIG. 1, the mechanism 147 is a member that is secured to the light guide 102 and slides over a portion of the housing 140 of the light bulb 200. In one embodiment, the amount of movement may be limited by stops (not shown). Other manually-operated mechanisms are possible. For instance, other types of sliders may be employed or a turnable knob may act on the moveable component through a gear or drive train. In other embodiments, the mechanism 147 is motorized to move one or both of the light guide 102 and the light source 104 relative to the other. The motorized mechanism may be controlled by a control assembly (not shown) to adjust light output based on user input, feedback from sensors, or a triggering event. In still other embodiments, there is no mechanism 147 and the adjustment is made by applying a positioning force, which in the case of the exemplary cylinder is torque, directly to the moveable one of the light source assembly 103 and the light guide 102.

Once positioned, the relative positioning of the light input regions and the light source 104 remains unchanged until the user or control assembly varies the relative positioning. Since constant motion of the light guide 102 and the light source 104 relative to one another is not contemplated during operation of the lighting assembly 100, the range of movement of the light guide 102 and/or the light source 104 may be limited. The range of movement may be limited to back-and-forth sliding that moves the light input regions 117, 118 in and out of alignment with the light source 104, rather than allowing infinite movement of the light guide 102 or the light source 104 in one direction.

A visual indicator may be present to provide the user with an indication of the modification of the light output of the lighting assembly 100. In the illustrated embodiment of FIG. 1, for example, markings 146 are present on the light guide 102 and align relative to a pointer 148 on the housing to provide this indication.

FIGS. 7-10 illustrate part of another embodiment of a lighting assembly with an adjustable light output. More specifically, FIGS. 7-10 illustrate an exemplary application in which the light ray angle distribution of the light input to the light guide are modified such that that the light ray angle distribution of the light output from the lighting assembly depends on the relative positioning of the light source and the light input regions.

Figure 7:
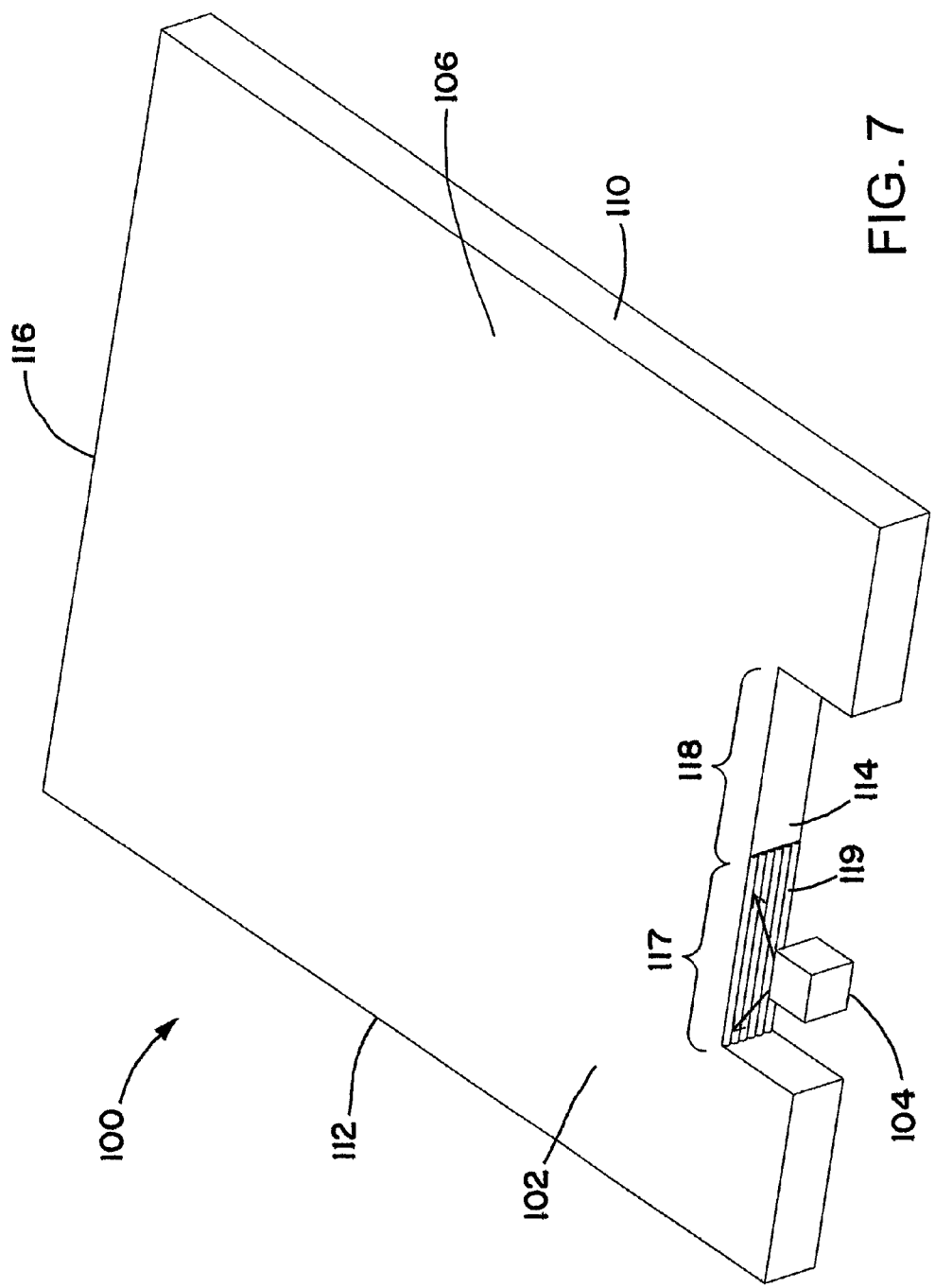
FIGS. 7-10 are schematic views showing part of another embodiment of a lighting assembly having adjustable light output.
Figure 8:
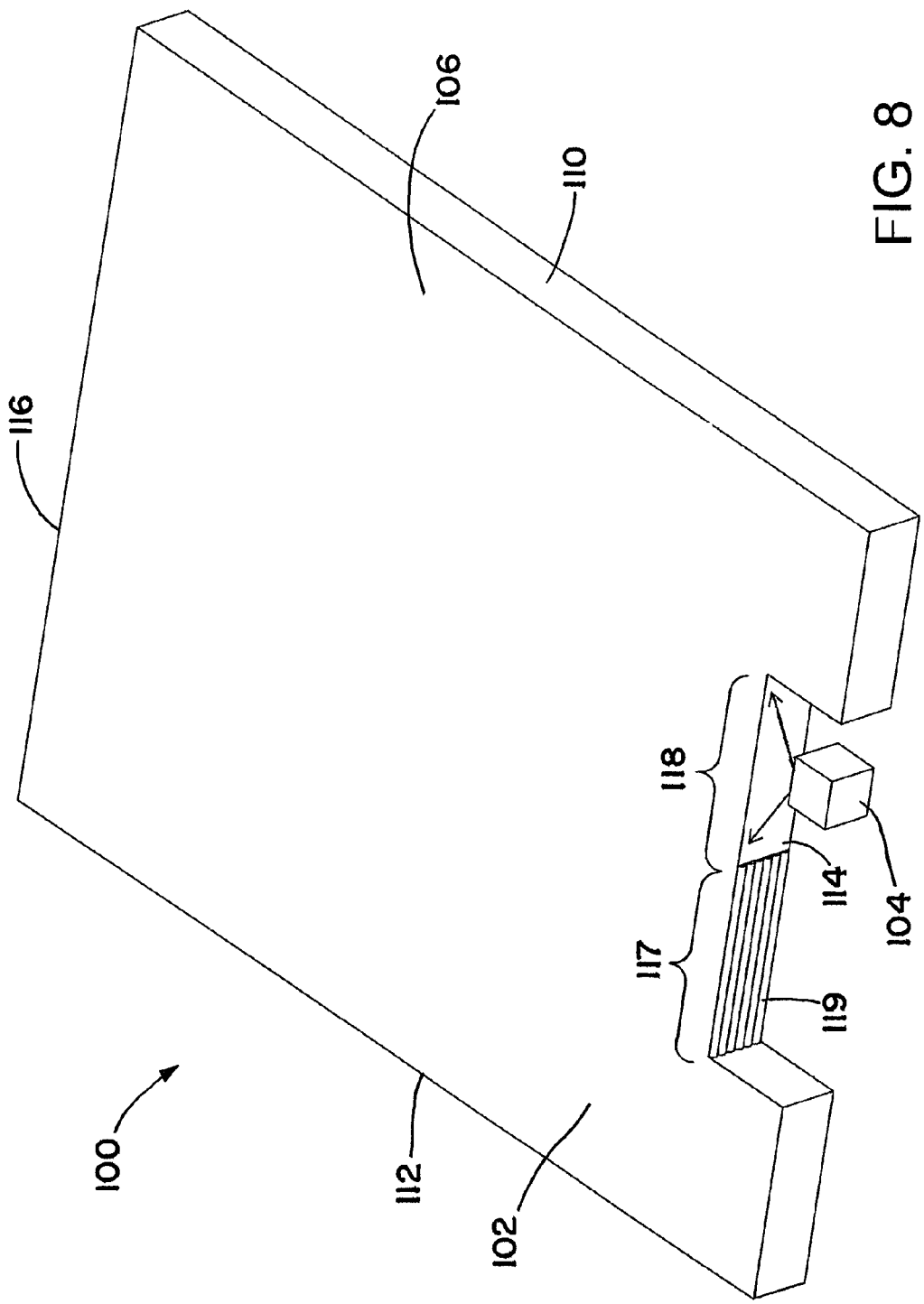

In the embodiment shown in FIGS. 7 and 8, the lighting assembly is similar to that illustrated in FIGS. 3-6, but the light input regions 117, 118 are located at a recessed portion of edge 114. The recessed position of the light input regions 117, 118 does not change the effect of the optical modifying characteristics of the light input regions 117, 118 on the light incident thereon, but the recessed configuration is simply shown to illustrate that the light guide 102 may be any suitable shape. Light input region 117 includes optical elements 119 illustrated as lenticular grooves oriented parallel to the major surfaces 106, 108. Light input region 118 includes a planar surface.

Figure 9:
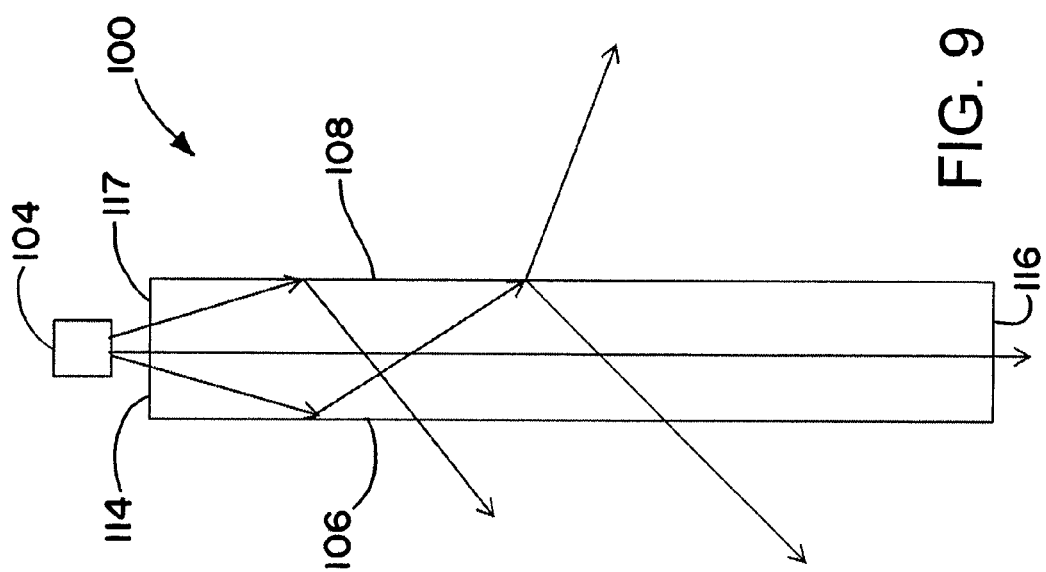

FIGS. 7 and 9 illustrate a relative positioning of the light source 104 and the light input edge 114 wherein more of the light emitted from the light source is incident on light input region 117 than on light input region 118. Referring first to FIG. 7, light input region 117 includes lenticular grooves oriented parallel to the major surfaces 106, 108. The lenticular grooves change the light ray angle distribution of the light emitted from the light source 104 and incident on the first light input region 117. The lenticular grooves spread the light entering the light guide 102 through the light input region 117 in a plane orthogonal to the major surfaces 106, 108 and the light input edge 114. Referring now to FIG. 9, more of the light entering the light guide 102 is incident on the major surfaces 106, 108 at smaller angles of incidence (relative to the normal) due to refraction of the light at the optical elements 119 and therefore more of the light propagates in higher modes in the light guide 102. As described above, the first and second major surfaces 106, 108 include light extracting elements (not shown). As a result of the greater amount of light propagating in the higher propagation modes, more of the light emitted from the light source and incident on the first light input region 117 exits through one or both of the first major surface 106 and the second major surface 108 than through the edge 116, as illustrated in FIG. 9.

Figure 10:
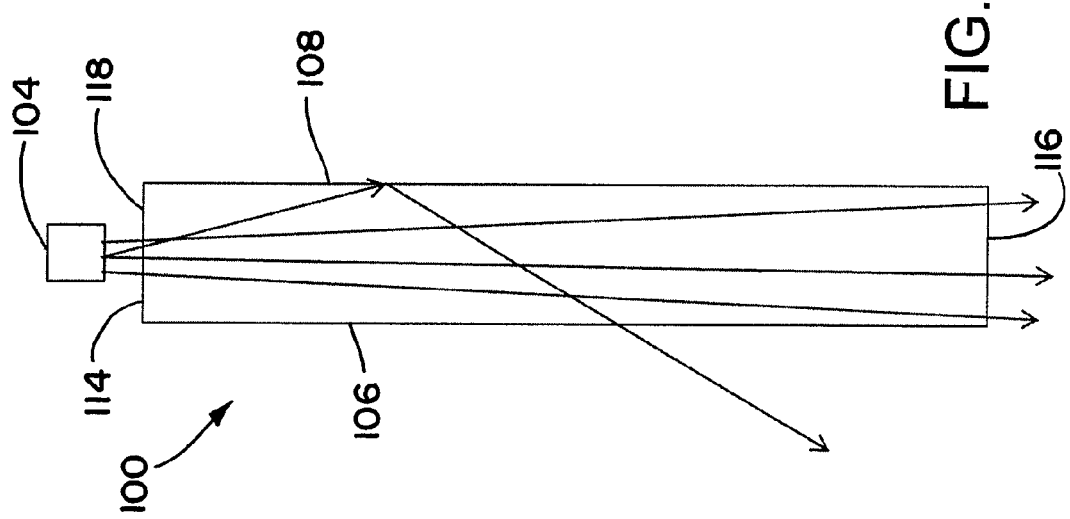

FIGS. 8 and 10 illustrate a relative positioning of the light source 104 and the light input edge 114 wherein more of the light emitted from the light source is incident on the light input region 118 than is incident on the light input region 117. Referring first to FIG. 8, the light input region 118 has a planar surface. The planar surface of the light input region 118 is specularly transmissive. Referring now to FIG. 10, more of the light entering the light guide 102 through the light input region 118 is incident on the major surfaces at larger angles of incidence (relative to the normal) and therefore more of the light propagates in the light guide at lower modes in the light guide. As a result of the greater amount of light propagating in the lower propagation modes, more of the light emitted from the light source 104 and incident on the second light input region 118 exits the light guide 102 through the edge 116 than through the major surfaces 106, 108.

Figure 11:
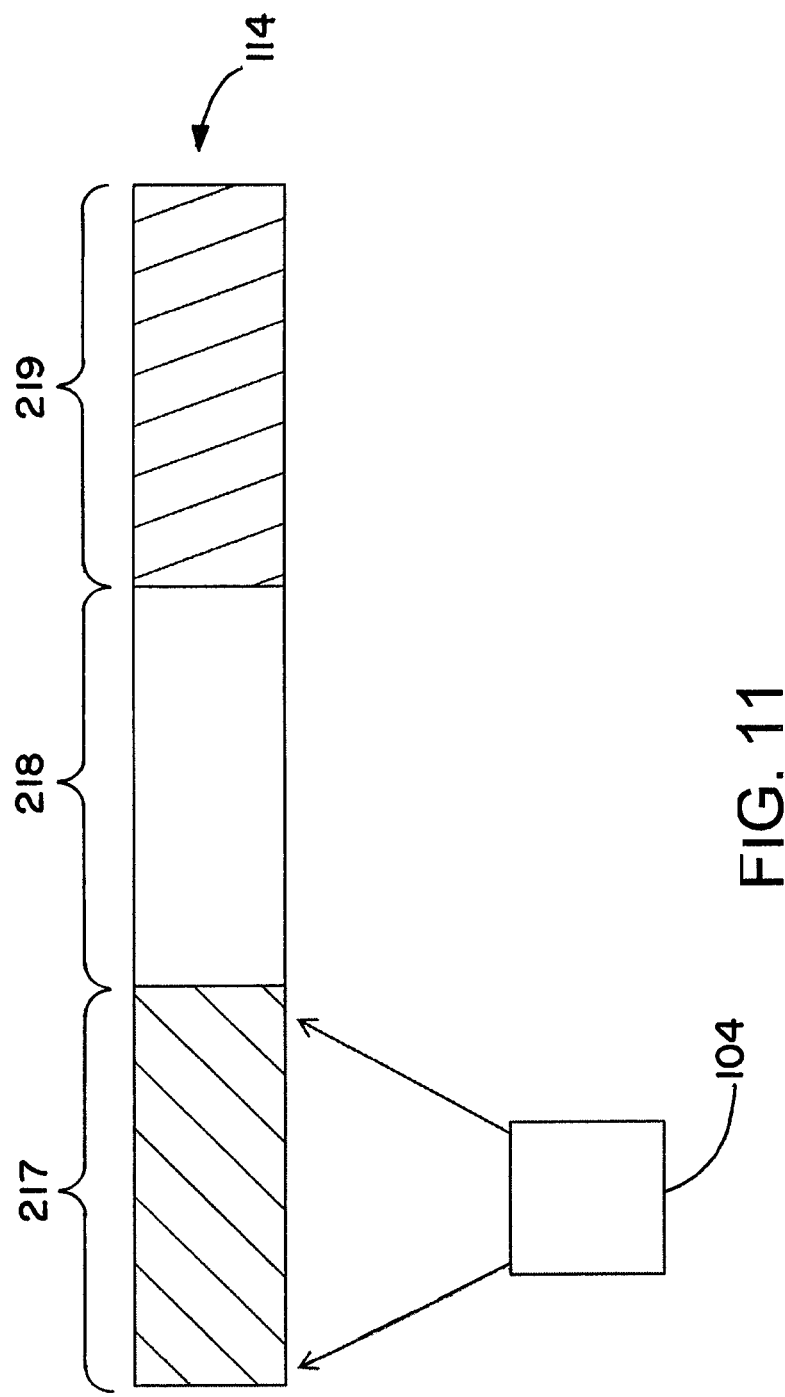
FIGS. 11-13 are schematic views showing an arrangement of light input regions of a lighting assembly having adjustable light output.
Figure 12:
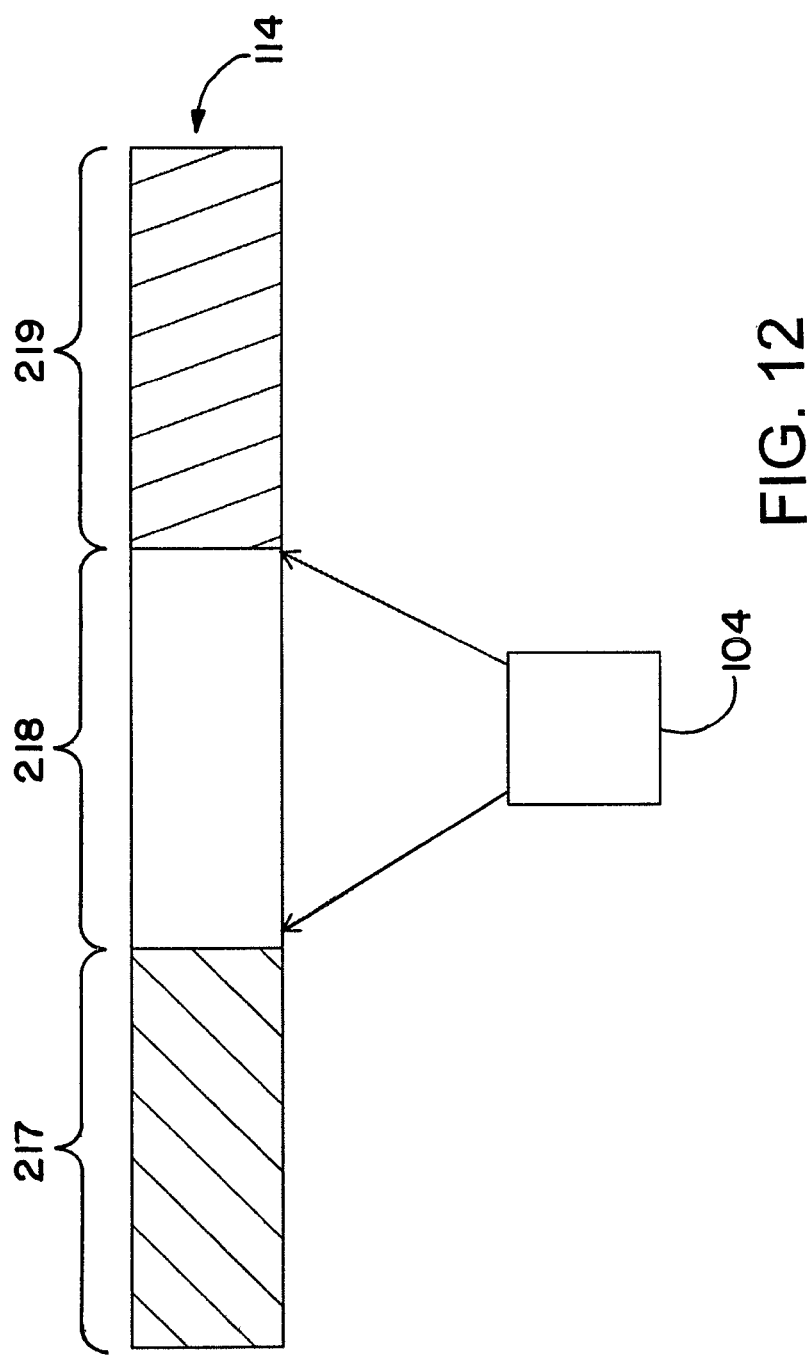
Figure 13:
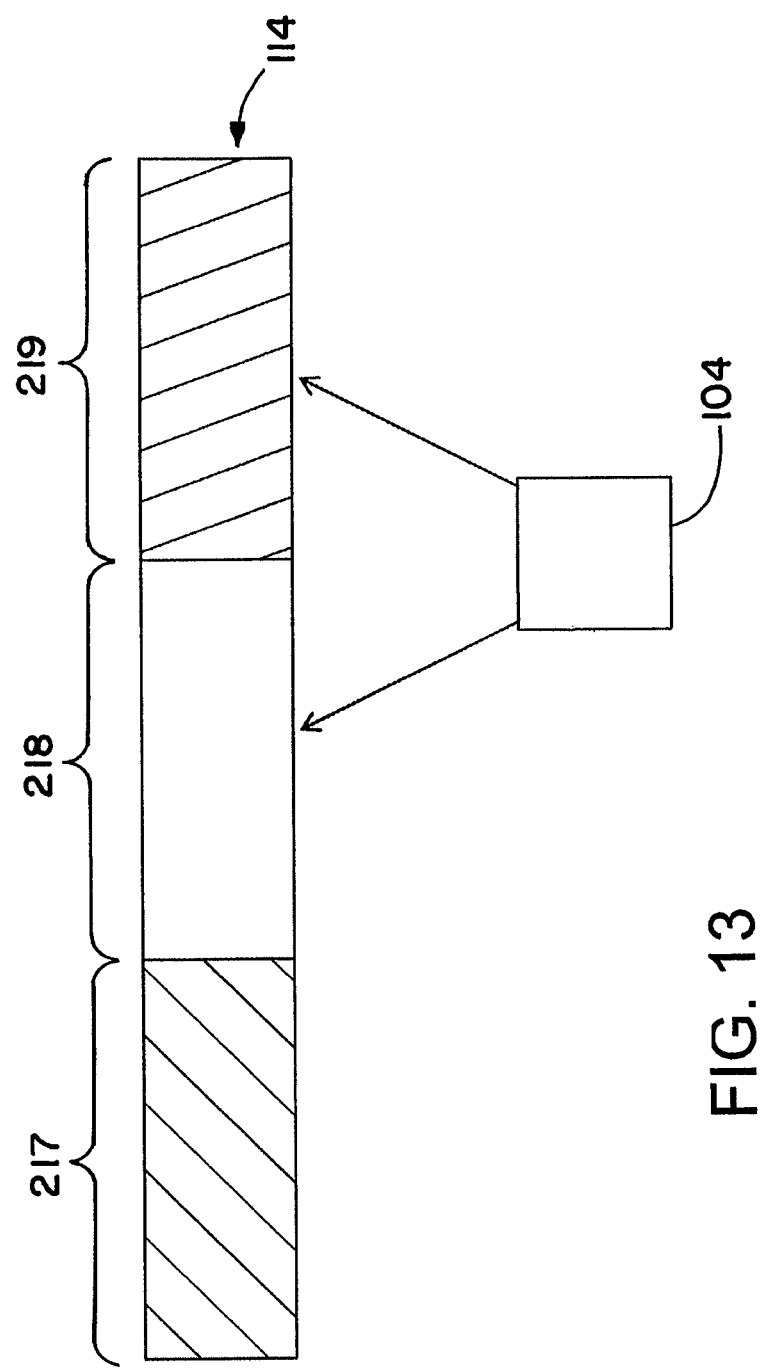

The above-described embodiments exemplify modification of the light ray angle distribution of the light input to the light guide 102 and, hence, the light ray angle distribution of the output light. The following embodiments provide examples of modification of the spectrum of the light incident on the light input regions. FIGS. 11-13 illustrate an example of a light input edge 114 having three light input regions 217, 218, 219, wherein at least one of the input regions includes a spectrum adjuster. Accordingly, FIGS. 11-13 illustrate an embodiment where the variable positioning of light source 104 and the associated light input regions relative to one another determines a modification of the spectrum of the light input to the light guide 102.

In the illustrated embodiment, the light input region 217 includes a spectrum adjuster, and the light input region 219 includes a spectrum adjuster that is different than the spectrum adjuster of the light input region 217. The presence of the respective spectrum adjusters in the light input regions 217, 219 is denoted by hatching. Light input region 218 is specularly transmissive and does not adjust spectrum. However, embodiments are contemplated where the light input region 218 also includes a spectrum adjuster.

In one embodiment, the respective spectrum adjuster in the light input regions is a region of wavelength shifting material. Wavelength shifting is used herein to refer to a process in which a material absorbs light of certain wavelengths, and reemits light at one or more different wavelengths. The wavelength-shifting material includes one or more of a phosphor material, a luminescent material, a luminescent nanomaterial such as a quantum dot material, a conjugated polymer material, an organic fluorescent dye, an organic phosphorescent dye, and lanthanide-doped garnet. In another embodiment, the respective spectrum adjuster in the light input regions is a region of color attenuating material, for example, a color filter. In other embodiments, the light input regions respectively include both a wavelength shifting material and a color attenuating material. For example, the spectrum adjuster of one of the light input regions may include a wavelength shifting material and the spectrum adjuster of another of the light input regions may include a color attenuating material.

Similar to the above-described embodiments, the light source 104 and the light input regions 217, 218, 219 are variably positionable relative to one another such that light emitted from the light source and incident on the light input regions is apportioned among the light input regions depending on the relative positioning of the light input regions 217, 218, 219 and the light source 104. Accordingly, the light source 104 may be located adjacent the light input edge in a position corresponding to any one of the light input regions 217, 218, 219. For example, in FIG. 11, the light source 104 is located adjacent the light input region 217 of the light input edge 114 such that more of the light emitted from the light source 104 is incident on the light input region 217 than on the light input regions 218, 219. In FIG. 12, the light source 104 is located adjacent the light input region 218 of the light input edge 114 such that more of the light emitted from the light source 104 is incident on the light input region 218 than on the light input regions 217, 219. Similarly, when the light source 104 is located adjacent the light input region 219 of the light input edge 114, more of the light emitted from the light source 104 is incident on the light input region 219 than on the light input regions 217, 218. Light emitted from the light source 104 and incident on the input region 217 is input to the light guide with a first spectrum, light emitted from the light source and incident on the light input region 218 is input to the light guide with a second spectrum, and light emitted from the light source and incident on the light input region 219 is input to the light guide with a third spectrum, in accordance with the light modifying characteristics of the respective light input regions.

The light source 104 may also be located adjacent a region of the light input edge 114 in an intermediate position between two adjacent ones of the light input regions 217, 218, 219. For example, in FIG. 13, the light source 104 is located in an intermediate position adjacent both the light input region 218 and the light input region 219 of the light input edge 114 such that a portion of the light emitted from the light source 104 is incident on the light input region 218 and another portion (typically the remainder) of the light emitted from the light source is incident on the light input region 219. Accordingly, the light input to the light guide with different spectra from the respective light input regions mixes in the light guide to provide light with a spectrum that is the sum of the spectra of light input to the light guide 102 through the light input regions 218, 219 weighted in accordance with the apportioning of the light between the light input regions 218, 219.

Figure 14:
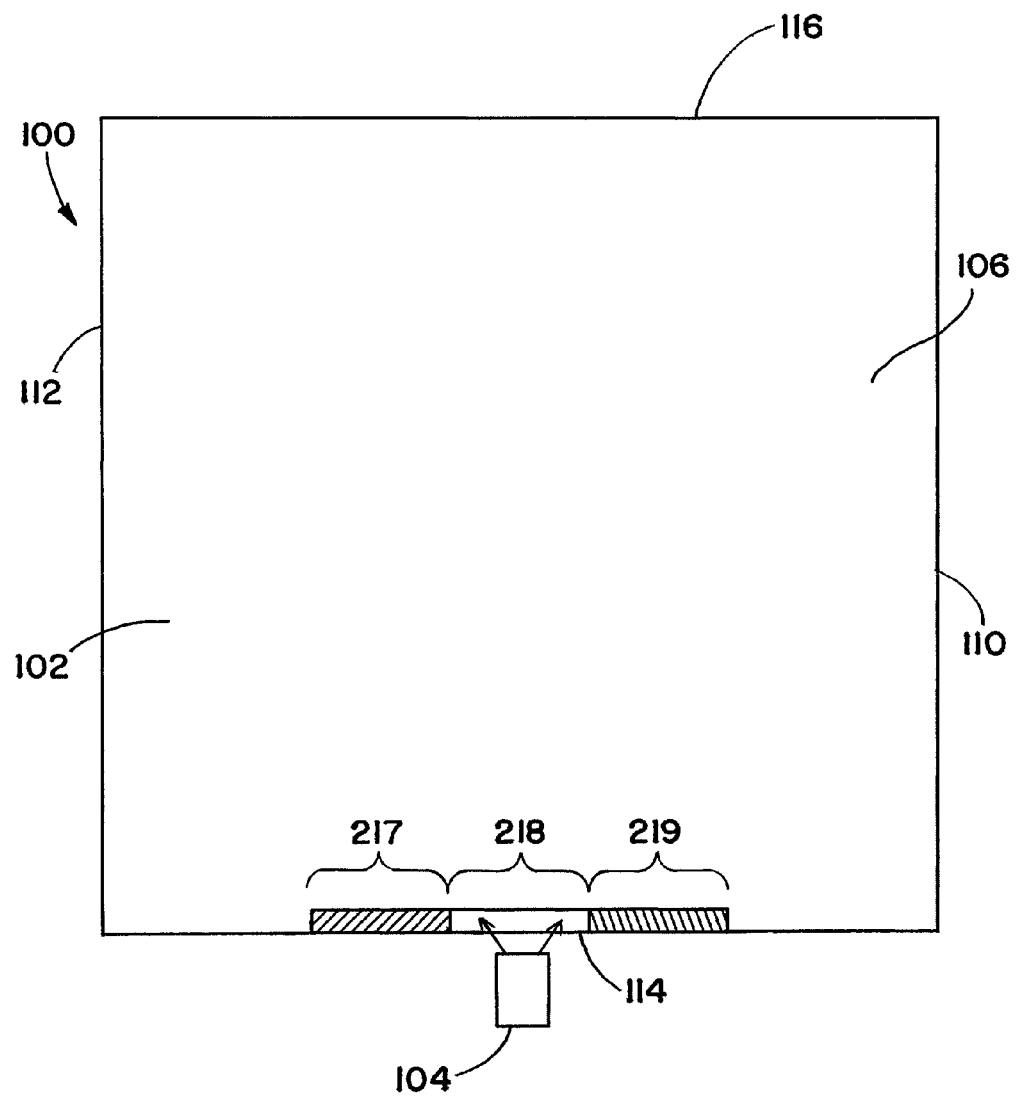
FIGS. 14-16 are schematic views showing part of another embodiment of a lighting assembly having adjustable light output.
Figure 15:
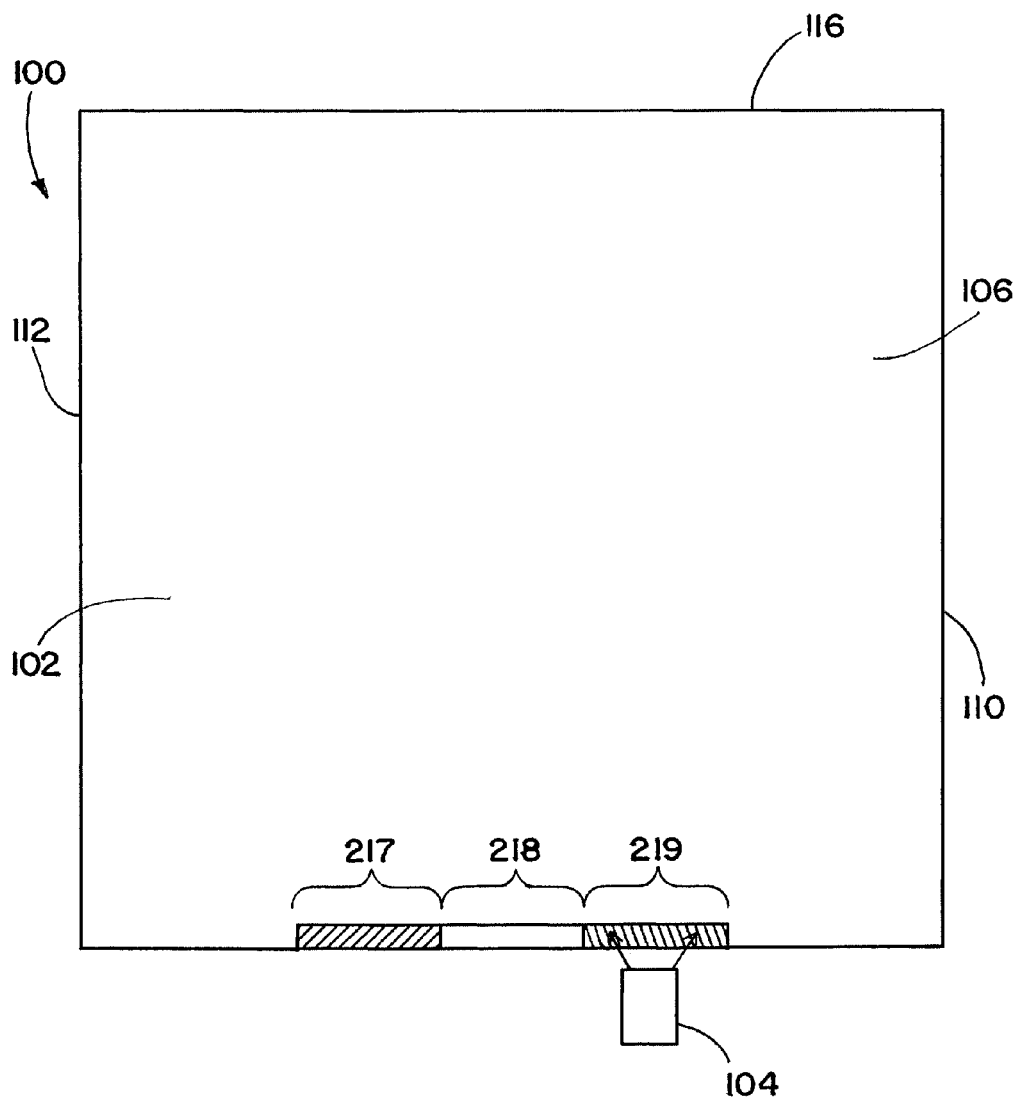
Figure 16:
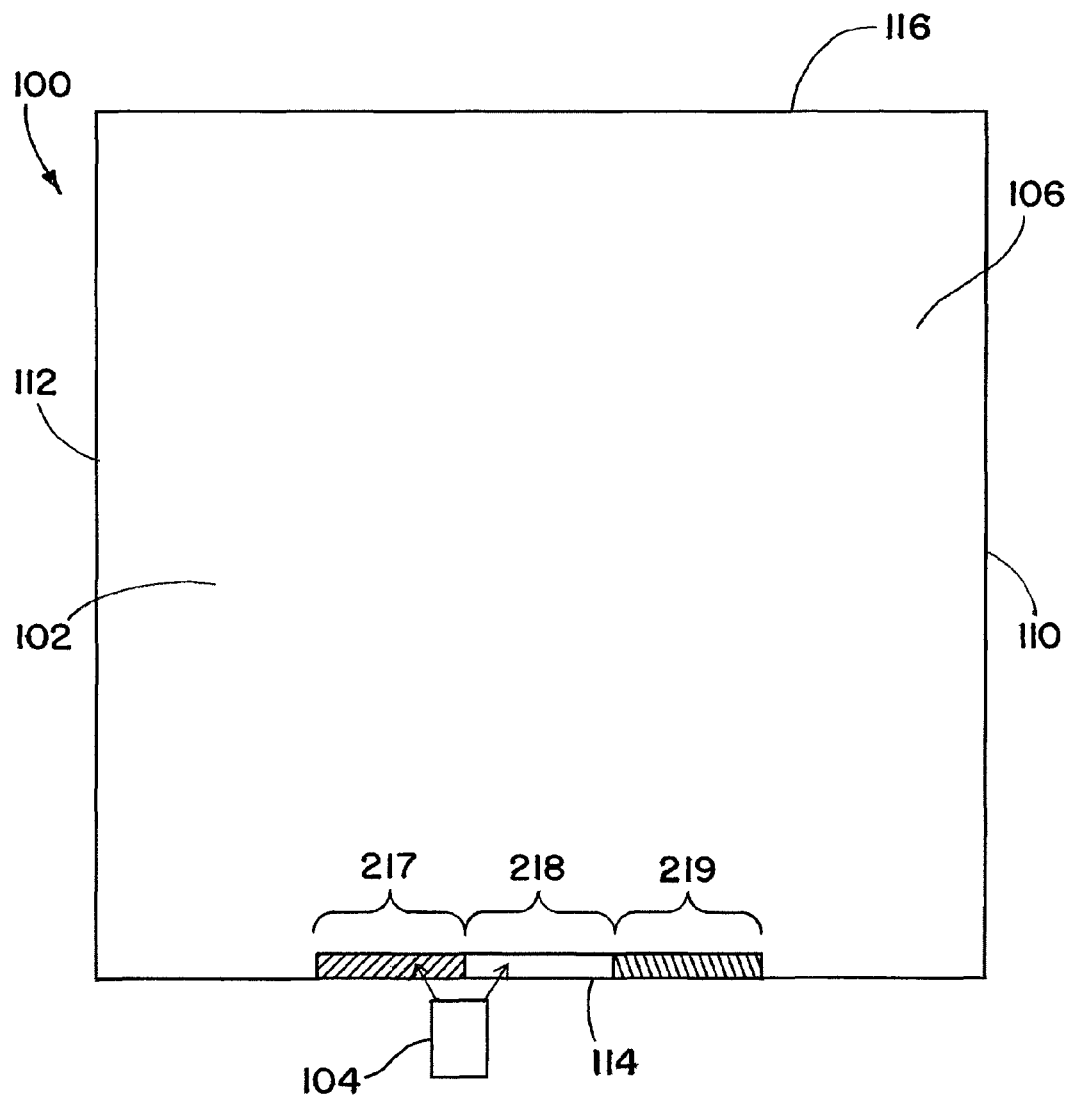

FIGS. 14-16 illustrate an exemplary application of the lighting assembly 100 as described with reference to FIGS. 11-13. More specifically, FIGS. 14-16 illustrate an application in which the spectrum of the light output from the lighting assembly is modified based on relative positioning of the light source 104 and the light input regions 217, 218, 219. The application will be described with reference to an example in which the color temperature of the output light from the lighting assembly 100 is varied.

Many LED light sources 104 emit light in a range of wavelengths intended to achieve a corresponding color temperature. However, within batches of LEDs having the same nominal color temperature, there is variation of color temperature from LED to LED. Also, sometimes broad-spectrum LEDs (e.g., "white light" LEDs) or groups of tri-color LEDs (e.g., a red LED, a blue LED and a green LED whose outputs combine to produce white light) do not produce a color temperature that is desirable to a user or appropriate for a certain lighting application. To modify the color temperature of the light output from the lighting assembly 100, the light input region 217 and the light input region 219 may be used to modify the spectrum (color temperature in this case) of the light output by the lighting assembly 100. In this example, the light input region 217 modifies the light output to be warmer (either or both of more red and less blue) and the light input region 219 modifies the light output to be cooler (either or both of more blue and less red). The light input region 218 is specularly transmissive, and light incident thereon enters the light guide with the same spectrum (color temperature in this case) as the light emitted from the light source 104. The relative positioning of the light source 104 and the light input regions 217, 218, 219 (as illustrated in FIGS. 14-16) varies the apportionment of the incident light between the light input regions, therefore resulting in a corresponding variation in color temperature of the light output from the lighting assembly 100.

Some embodiments are configured to allow a user to vary the color temperature of light output from the lighting assembly 100 in order to achieve a desired color temperature. Other embodiments are configured to allow a manufacturer of the lighting assembly 100 to vary the color temperature of light output from the lighting assembly 100 to compensate for different color temperatures associated with different lots of light sources 104. This allows the lighting assembly manufacturer to source a broader range of light sources 104 from one or more suppliers and still manufacture lighting assemblies with a defined, consistent color temperature.

In some embodiments, the relative positioning of the light input regions 217, 218, 219 and the light source 104 is varied by the manufacturer of the lighting assembly 100 until the output light has a defined characteristic. The relative positioning is then fixed by the manufacturer, and the lighting assembly 100 is configured in a manner to minimize the ability of a user of the lighting assembly 100 to further vary the relative positioning. In other embodiments, the user has the ability to vary the relative positioning.

Embodiments are also contemplated where one or more of the respective light input regions associated with a light source modifies both the spectrum and the light ray angle distribution of the light incident thereon. FIG. 17 illustrates an exemplary configuration of light input regions 217, 218, 219 and 317, 318, 319 of light input edge 114, wherein at least one of the input regions includes a spectrum adjuster and optical elements. Similar to the light input regions described above with reference to FIGS. 11-13, light input regions 217, 219 each include spectrum adjusters, and light input region 218 is specularly transmissive. Light input region 317 includes a spectrum adjuster similar to the spectrum adjuster of light input region 217, and light input region 319 includes a spectrum adjuster similar to the spectrum adjuster of light input region 219. In addition, light input regions 317, 318, 319 include optical elements 220 that modify the light ray angle distribution of the light incident thereon. In the illustrated embodiment, the optical elements 220 of light input regions 317, 318, 319 are similar.

The relative positioning of the light source 104 and the light input regions 217, 218, 219 modifies the spectrum of the light input to the light guide 102 with a first light ray angle distribution, and the relative positioning of the light source 104 and the light input regions 317, 318, 319 modifies the spectrum of the light input to the light guide 102 with a second light ray angle distribution, different from the first light ray angle distribution.

In the above-described examples, the boundaries between the adjacent light input regions are depicted as extending orthogonally to the plane of the major surfaces 106, 108. In other examples (not shown), the boundaries of the light input regions extend non-orthogonally to the plane of the major surfaces 106, 108. In one particular example, the boundaries slope towards one another, allowing the light from the light source 104 to be apportioned among three light input regions depending on the relative positioning of the light source 104 and the light input regions along a direction parallel to the major surfaces 106, 108 of the light guide 102.

The embodiments described thus far have illustrated relative positioning of the light source 104 and light input regions along one direction (i.e., along a direction parallel to the major surfaces 106, 108 of the light guide 102 and the light input edge 114 (e.g., FIGS. 4-6)). As illustrated in FIGS. 18 and 19, the light source 104 and light input regions are variably positionable relative to one another along two directions (i.e., along a direction parallel to the major surfaces 106, 108 of the light guide 102, and along a direction orthogonal to the major surfaces 106, 108 of the light guide 102). Accordingly, two variables are provided for modifying the characteristics of the light output of the lighting assembly 100. In the examples shown in FIGS. 18 and 19, light input regions are arrayed along both the first direction 131 and second direction 132 relative to light input edge 114 of the light guide. The light source 104 and light input regions are relatively positionable along two directions 131, 132 to apportion the light emitted from the light source between two, three or four of the light input regions.

FIG. 18 illustrates an embodiment having three light input regions 417, 418, 419. FIG. 19 illustrates an embodiment having four light input regions 417, 418, 419, 420. Consistent with the above-described embodiments, one or more of the respective light input regions includes optical elements and/or a spectrum adjuster.

In one embodiment, the relative positioning of the light source 104 and the light input regions along the first direction 131 provides a first modification of the spectrum, and the relative positioning of the light source and the light input regions along the second direction 132, in the example shown, orthogonal to the first direction, provides a second modification of the spectrum, different from the first modification of the spectrum. In an example of the embodiment shown in FIG. 18, the light input regions 417, 418 include respective spectrum adjusters and the light input region 419 is specularly transmissive and does not adjust spectrum. The relative positioning of the light source 104 along the two directions 131, 132 apportions the light from the light source among the light input regions 417, 418, 419 to provide a desired light output spectrum from the lighting assembly 100.

In another embodiment, moving the light source along the first direction 131 modifies the light ray angle distribution and moving the light source along the second direction 132 modifies the spectrum. In an example of the embodiment shown in FIG. 19, light input regions 417, 418 include similar spectrum adjusters, and light input regions 418, 420 include similar optical elements. Light input region 419 is specularly transmissive and does not adjust spectrum. By moving the light source along the first direction 131, output light with a desired light ray angle distribution is obtained. By moving the light source along the second direction 132, output light with a desired light output spectrum is obtained. By moving the light source along the first direction 131 and the second direction 132, output light with a desired combination of light ray angle distribution and spectrum is obtained.

Figure 20:
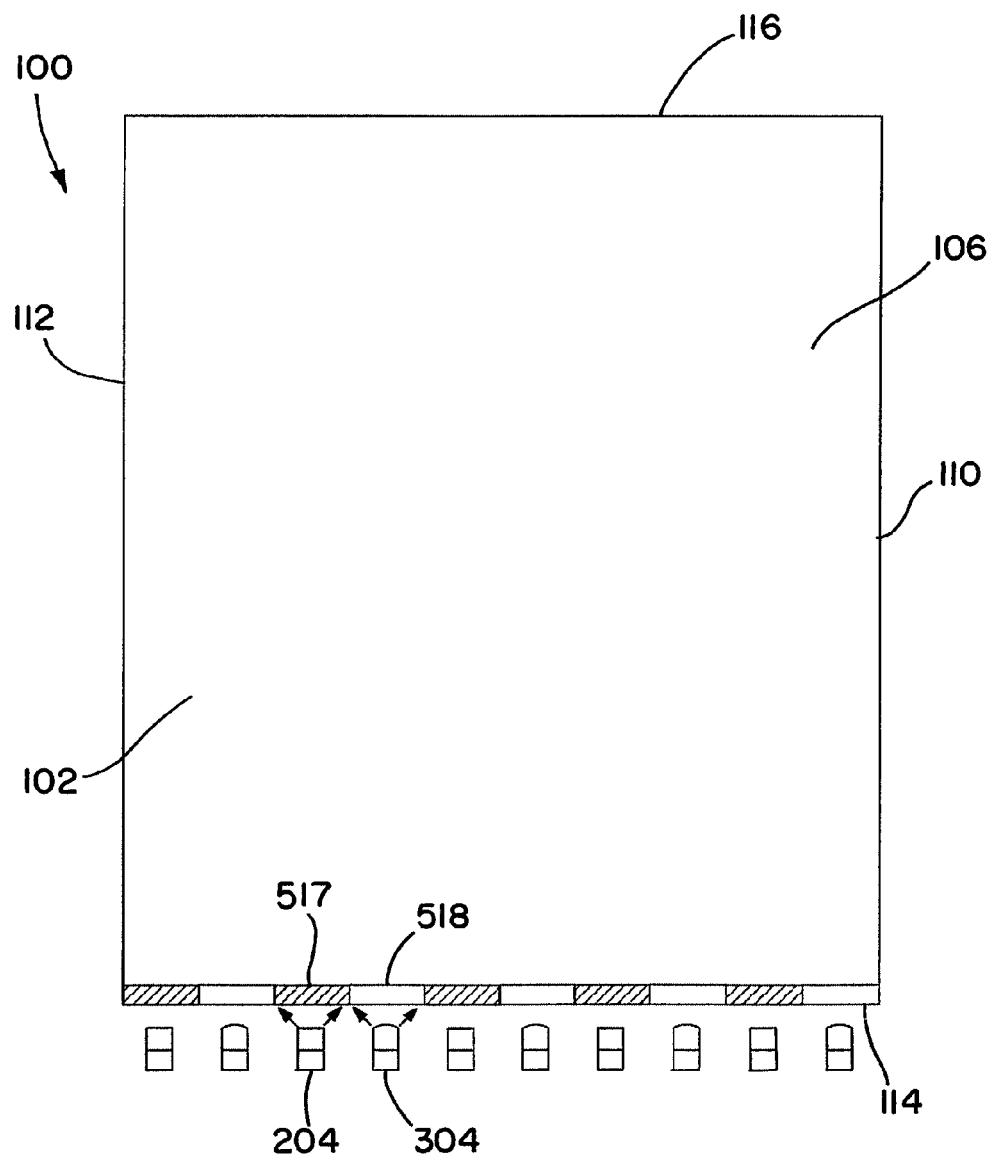
FIGS. 20 and 21 are schematic views showing part of another embodiment of a lighting assembly having adjustable light output.
Figure 21:
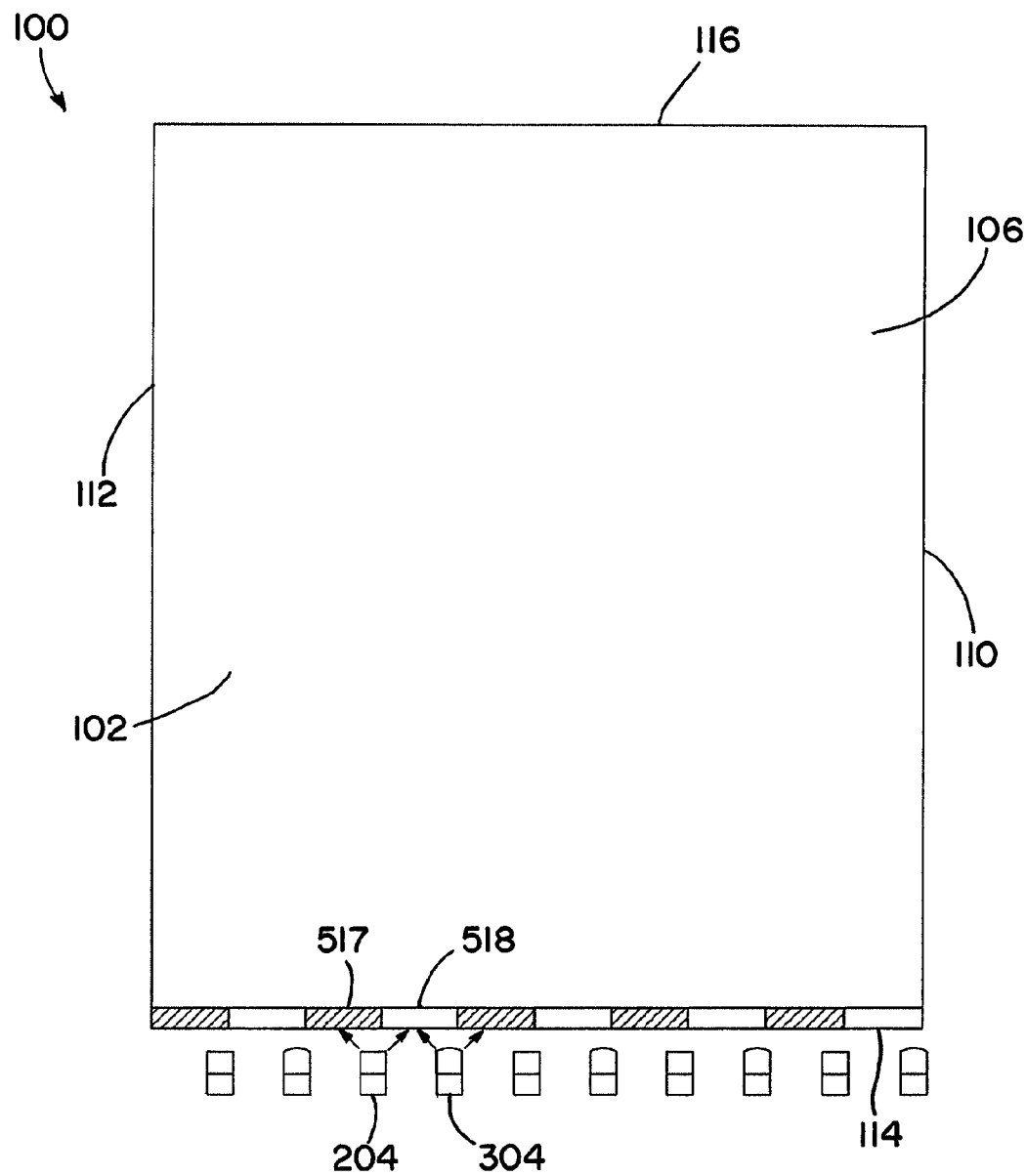

FIGS. 20 and 21 illustrate another embodiment in which the lighting assembly includes multiple types of light sources 204, 304. In this embodiment, the two types of light sources are alternately located along the light input edge 114 of the light guide 102. Light sources of a first light source type 204 emit light with a first spectrum, and light sources of a second light source type 304 emit light with a second spectrum, different from the first spectrum. For example, in one embodiment, the light sources of the first light source type 204 emit "white" light and the light sources of the second light source type 304 emit red light. The light sources 204, 304 are mounted on a common PCB (not shown) such that the light sources and the associated light input regions of the light guide 102 are positionable relative to one another in concert. Light emitted from each light source 204, 304 is incident on one or more light input regions.

Two types of light input regions 517, 518 are alternately located along the input edge 114 of the light guide 102. The light input regions of a first light input region type 517 have a first transmissivity and the light input regions of a second light input region type 518 have a second transmissivity, different from the first transmissivity. In one embodiment, light input region types 517, 518 include at least one of a reflective material and a light absorbing material to reduce the intensity of light input into the light guide 102.

In the illustrated example, the lighting assembly 100 is configured such that, for a given positional relationship between the light sources 204, 304 and the light input regions 517, 518, the apportionment of the light from each type of light source between the light input regions is the same. For example, FIG. 20 illustrates a relative positioning wherein more of the light emitted from the light sources 204 of the first light source type is incident on the light input regions 517 of the first light input region type than on the light input regions 518 of the second light input region type; and more of the light emitted from the light sources 304 of the second light source type is incident on the light input regions 518 of the second light input region type than on the light input regions 517 of the first light input region type.

FIG. 21 illustrates a relative positioning of the light sources and the light input regions wherein a portion of the light emitted from the light sources 204 of the first light source type and a portion of the light emitted from the light sources 304 of the second light source type are incident on a same one of the light input regions 517, 518 of the first and second light input region types. Light input to the light guide 102 from the light sources 204 of the first light source type and light input to the light guide 102 from the light sources 304 of the second light source type mix in the light guide to provide light with a spectrum that is the sum of the spectra of light input to the light guide 102 from the light sources 204, 304 of the first and second light source types weighted in accordance with the apportioning of the light between the light input regions of the first and second light input region types. In the illustrated example, the transmissivity of the respective light input regions 517, 518 of the first and second light input region types and the relative positioning of the light sources 204, 304 of the first and second light source types collectively control a characteristic (in this example, spectrum) of the light output from the lighting assembly 100.

Other applications are apparent based on using any of the above-noted light modifying characteristics for the light input regions.

Returning to FIG. 1, additional details regarding the lighting assembly 100 when embodied as the light bulb 200 will be described. The light bulb 200 includes a base 150. The illustrated base 150 is an Edison base, but other types of bases 150 may be used, including any commercially-standard base or proprietary base used for mechanically securing an incandescent bulb, a fluorescent bulb, a compact fluorescent bulb (CFL), a halogen bulb, a high intensity discharge (HID) bulb, an arc lamp, or any other type of bulb into a lamp, a lighting fixture, a flashlight, a socket, etc., and/or for supplying electricity thereto. The light bulb 200 typically further includes a heat sink 151 that dissipates heat generated by the light sources 104. The heat sink 151 of the illustrated embodiment forms part of the housing 140. Parts of the light bulb 200, such as the light guide 102 and the light source 104, are described above with reference to FIGS. 3-21.

References herein to a "light bulb" are meant to broadly encompass light-producing devices that fit into and engage any of various fixtures for mechanically mounting the light-producing device and for providing electrical power thereto. Examples of such fixtures include, without limitation, screw-in fixtures for engaging an Edison light bulb base, a bayonet fixture for engaging a bayonet light bulb base, or a bi-pin fixture for engaging a bi-pin light bulb base. Thus the term "light bulb," by itself, does not provide any limitation on the shape of the light-producing device, or the mechanism by which light is produced from electric power. Also, the light bulb need not have an enclosed envelope forming an environment for light generation. The light bulb may conform to American National Standards Institute (ANSI) or other standards for electric lamps, but the light bulb does not necessarily have to have this conformance.

Returning to FIG. 2, additional details regarding the lighting fixture 300 will be described. The lighting fixture 300 may be a hanging light (as shown), a ceiling light (e.g., an assembly to fit in a drop-down ceiling or secure flush to a ceiling), a wall sconce, a table lamp, a task light, or any other illumination device. The lighting fixture 300 includes a housing 140 for retaining the light source assembly 103 and the light guide 102. The housing 140 may retain or may serve as a heat sink. In some embodiments, the lighting fixture 300 includes a mechanism 160 (e.g., a chain or wire in the case of a hanging light, clips or fasteners in the case of a ceiling light or wall sconce, etc.) to mechanically secure the lighting assembly to a retaining structure (e.g., a ceiling, a wall, etc.). In other embodiments, the mechanism 160 is a stand and/or base assembly to allow the lighting fixture 300 to function as a floor lamp, table lamp, task lamp, etc. Electrical power is supplied to the lighting fixture through appropriate conductors, which in some cases may form part of or pass through the mechanism 160. Parts of the lighting fixture, such as the light guide 102 and the light source 104, are described above with reference to FIGS. 3-21.

In this disclosure, the phrase "one of" followed by a list is intended to mean the elements of the list in the alterative. For example, "one of A, B and C" means A or B or C. The phrase "at least one of" followed by a list is intended to mean one or more of the elements of the list in the alterative. For example, "at least one of A, B and C" means A or B or C or (A and B) or (A and C) or (B and C) or (A and B and C).

What is claimed is:

1. A lighting assembly, comprising:
   a light guide to propagate light by total internal reflection, the light guide comprising opposed major surfaces and a light input edge extending between the opposed major surfaces, the light input edge comprising light input regions, at least one of the light input regions associated with an optical modifying characteristic;
   a light source assembly comprising a light source, the light source located adjacent the light input regions; and
   a housing retaining the light source assembly and the light guide, and as retained by the housing, the light source and the light input regions are variably positionable relative to one another to vary a location at which light is incident on the light input regions such that light emitted from the light source is selectively apportioned between the light input regions so that a characteristic of the light output from the lighting assembly is modified based on the optical modifying characteristic of the at least one of the light input regions and the relative positioning of the light source and the light input regions.

2. The lighting assembly of claim 1, wherein the characteristic of the light output from the lighting assembly that is modified is spectrum.

3. The lighting assembly of claim 1, wherein the characteristic of the light output from the lighting assembly that is modified is light ray angle distribution.

4. The lighting assembly of claim 1, wherein the light source and the light input regions are variably positionable relative to one another between a first position wherein more of the light emitted from the light source is incident on one of the light input regions than on another of the light input regions, and a second position wherein a portion of the light emitted from the light source is incident on the one of the light input regions and a portion of the light emitted from the light source is incident on the other of the light input regions, the portions depending on the relative positioning of the light source and the light input regions.

5. The lighting assembly of claim 1, wherein one of the light input regions comprises an optical element.

6. The lighting assembly of claim 5, wherein the optical element comprises one or more of: lenticular grooves, V-grooves, micro-optical elements, and light-scattering elements.

7. The lighting assembly of claim 5, wherein another of the light input regions is planar.

8. The lighting assembly of claim 7, wherein:
   the light guide further comprises an end edge distal the light input regions and light extracting elements at at least one of the opposed major surfaces;
   the one of the light input regions is configured to direct light input to the light guide such that more of the light emitted from the light source, incident on the one of the light input regions, and input to the light guide is incident the opposed major surfaces and extracted by the light extracting elements through at least one of the opposed major surfaces than is incident and exits through the end edge; and
   the another of the light input regions is configured to direct light input to the light guide such that more of the light emitted from the light source, incident on the one of the light input regions, and input to the light guide is incident and exits through the end edge than is incident the opposed major surfaces and extracted by the light extracting elements through at least one of the opposed major surfaces.

9. The lighting assembly of claim 5, wherein the light input regions comprise optical elements configured to provide the light input regions with different optical modifying characteristics.

10. The lighting assembly of claim 9, wherein:
    the light guide further comprises an end edge distal the light input regions and light extracting elements at at least one of the opposed major surfaces;
    the one of the light input regions is configured to direct light input to the light guide such that more of the light emitted from the light source, incident on the one of the light input regions, and input to the light guide is incident the opposed major surfaces and extracted by the light extracting elements through at least one of the opposed major surfaces than is incident and exits through the end edge; and
    another of the light input regions is configured to direct light input to the light guide such that more of the light emitted from the light source, incident on the one of the light input regions, and input to the light guide is incident and exits through the end edge than is incident the opposed major surfaces and extracted by the light extracting elements through at least one of the opposed major surfaces.

11. The lighting assembly of claim 1, wherein one of the light input regions comprises a spectrum adjuster.

12. The lighting assembly of claim 11, wherein the spectrum adjuster comprises a color attenuating material.

13. The lighting assembly of claim 11, wherein the spectrum adjuster comprises a wavelength-shifting material.

14. The lighting assembly of claim 11, wherein another of the light input regions is specularly transmissive.

15. The lighting assembly of claim 11, wherein:
the light emitted from the light source and incident on the spectrum adjuster in one of the light input regions is input to the light guide with a first spectrum;
the light emitted from the light source and incident on another of the light input regions is input to the light guide with a second spectrum, different from the first spectrum; and
light input to the light guide with the first spectrum and light input to the light guide with the second spectrum mix in the light guide to form light having a combined spectrum that is the sum of the first spectrum and the second spectrum weighted in accordance with the apportioning of the light between the one of the light input regions and the other of the light input regions.

16. The lighting assembly of claim 11, wherein one of the light input regions comprises an optical element.

17. The lighting assembly of claim 16, wherein the optical element comprises one or more of: lenticular grooves, V-grooves, micro-optical elements, and light-scattering elements.

18. The lighting assembly of claim 11, wherein the light source and the light input regions are variably positionable relative to one another along in a first direction and a second direction to selectively apportion light emitted from the light source among at least three of the light input regions.

19. The lighting assembly of claim 18, wherein varying the relative positioning of the light source and the light input regions along the first direction modifies the spectrum of the output light in accordance with a first optical modifying characteristic and varying the relative positioning of the light source and the light input regions along the second direction modifies the spectrum of the output light in accordance with a second optical modifying characteristic different from the first optical modifying characteristic.

20. The lighting assembly of claim 18, wherein varying the relative positioning of the light source and the light input regions along the first direction modifies the spectrum of the output light and varying the relative positioning of the light source and the light input regions along the second direction modifies the light ray angle distribution of the output light.

21. The lighting assembly of claim 11, wherein:
another of the light input regions comprises a spectrum adjuster;
the respective spectrum adjusters each modify the spectrum of light incident thereon such that:
the light emitted from the light source and incident on the spectrum adjuster in the one of the light input regions is input to the light guide with a first spectrum; and
the light emitted from the light source and incident on the spectrum adjuster in the other of the light input regions is input to the light guide with a second spectrum, different from the first spectrum;
the light emitted from the light source and incident on a third of the light input regions is input to the light guide with a third spectrum different from the first spectrum and the second spectrum; and
light input to the light guide with the first spectrum, light input to the light with the second spectrum, and light input to the light guide with the third spectrum mix in the light guide to form light having a combined spectrum that is the sum of the first spectrum, the second spectrum, and the third spectrum weighted in accordance with the apportioning of the light between the one of the light input regions, the other of the light input regions, and the third of the light input regions.

22. The lighting assembly of claim 1, wherein the light source and the light input regions are variably positionable relative to one another such that a portion of the light emitted from the light source is incident on one of the light input regions, a portion of the light emitted from the light source is incident on another of the light input regions, and a portion of the light emitted from the light source is incident on a third of the light input regions.

23. The lighting assembly of claim 1, wherein the light source comprises a solid state light source.

24. The lighting assembly of claim 23, wherein the light source emits light with no operably-effective intensity at wavelengths greater than 500 nm.

25. The lighting assembly of claim 1, wherein one of the light input regions has a first transmissivity and another of the light input regions has a second transmissivity, different from the first transmissivity.

26. The lighting assembly of claim 25, wherein one of the light input regions comprises at least one of a reflective material and a light absorbing material.

27. The lighting assembly of claim 26, further comprising an additional light source located adjacent the light input regions, the light sources and the light input regions variably positionable relative to one another to input light at different locations relative to the light input regions.

28. The lighting assembly of claim 27, wherein the light sources and the light input regions are variably positionable relative to one another to a position wherein more of the light emitted from the light source is incident on one of the light input regions than on another of the light input regions, and more of the light emitted from the additional light source is incident on the other of the light input regions than on the one of the light input regions.

29. The lighting assembly of claim 27, wherein the light sources and the light input regions are variably positionable relative to one another to a position wherein a portion of the light emitted from the light source and a portion of the light emitted from the additional light source are incident on a same one of the light input regions.

30. The lighting assembly of claim 27, wherein:
the light source emits light with a first spectrum; and
the additional light source emits light with a spectrum different from the first spectrum.

31. The lighting assembly of claim 30, wherein light input to the light guide with the first spectrum and light input to the light guide with the second spectrum mix in the light guide to form light having a combined spectrum that is the sum of the first spectrum and the second spectrum weighted in accordance with the apportioning of the light with the first spectrum and the light with the second spectrum between the one of the light input regions and the other of the light input regions.

32. A lighting assembly, comprising:
a light guide to propagate light by total internal reflection, the light guide comprising opposed major surfaces and a light input edge extending between the opposed major surfaces, the light input edge comprising light input regions, at least one of the light input regions associated with an optical modifying characteristic;
a light source assembly comprising a light source, the light source located adjacent the light input regions, the light source and the light input regions variably positionable relative to one another to vary a location at which light is incident on the light input regions such that light emitted from the light source is selectively apportioned between the light input regions so that a characteristic of the light output from the lighting assembly is modified based on the optical modifying characteristic of the at least one of the light input regions and the relative positioning of the light source and the light input regions; and a user-manipulable adjustment mechanism coupled to one or both of the light guide and the light source and configured to adjust the positioning of the light source relative to the light input regions.

* * * * *